Nov. 13, 1951  R. G. GRIFFITH  2,575,268
PRINTING TELEGRAPH SYSTEM
Filed May 23, 1949  12 Sheets-Sheet 2

Inventor
Ronald G. Griffith
By Ralph B. Stewart
Attorney

Nov. 13, 1951   R. G. GRIFFITH   2,575,268
PRINTING TELEGRAPH SYSTEM
Filed May 23, 1949   12 Sheets-Sheet 3

Inventor
Ronald G. Griffith
By Ralph B. Stewart
Attorney

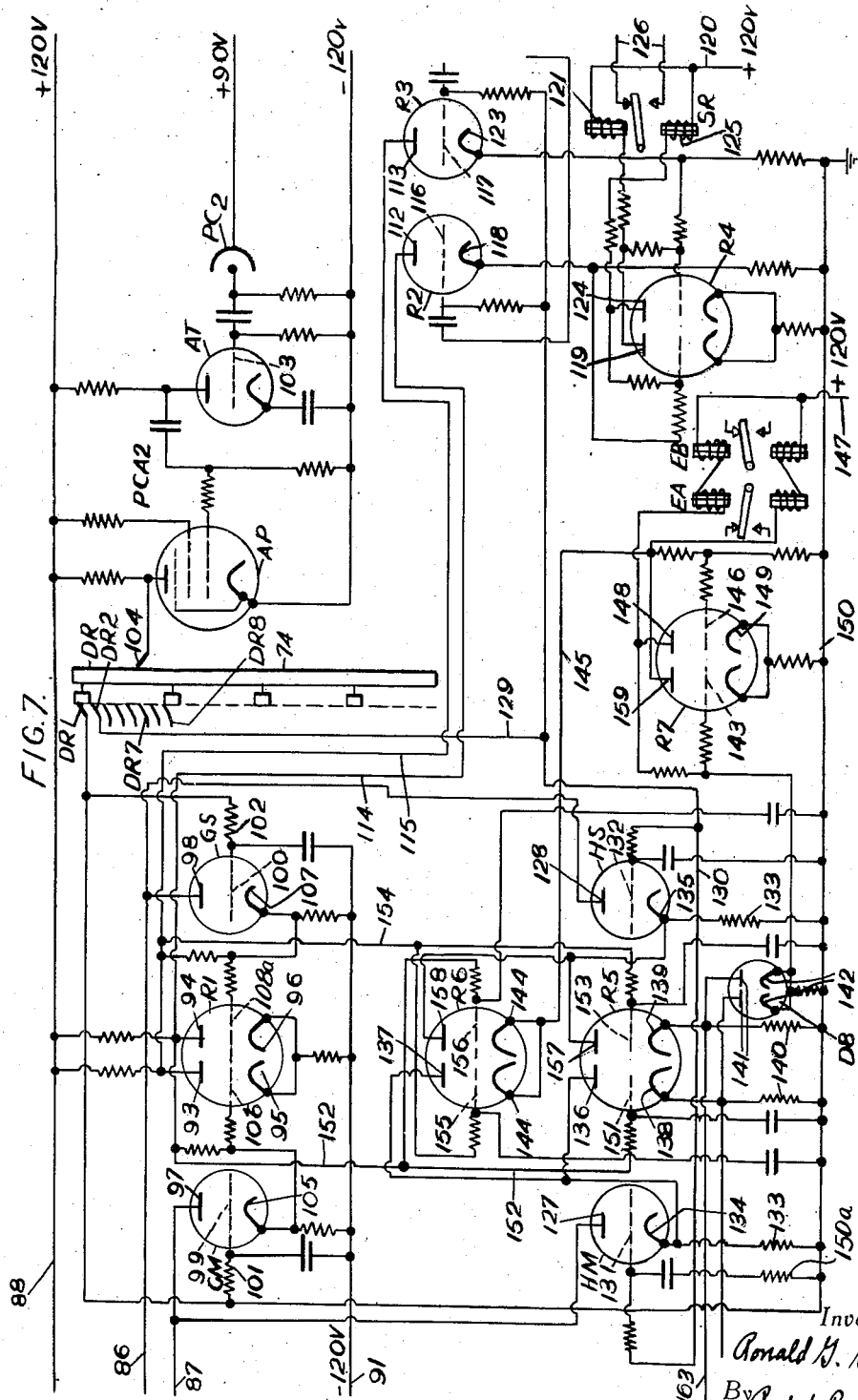

Nov. 13, 1951  R. G. GRIFFITH  2,575,268
PRINTING TELEGRAPH SYSTEM
Filed May 23, 1949  12 Sheets-Sheet 8
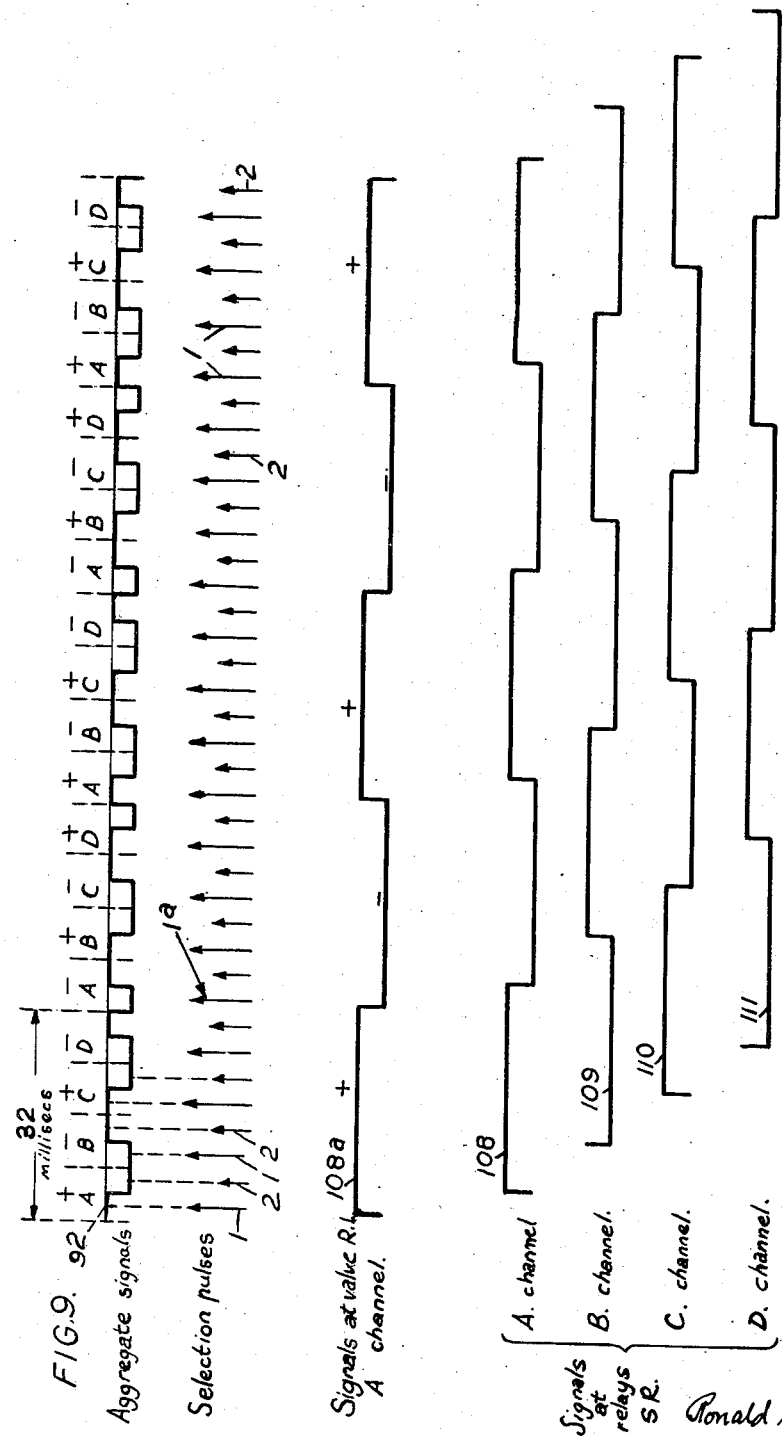
Inventor
Ronald G. Griffith
By Ralph B. Stewart
Attorney

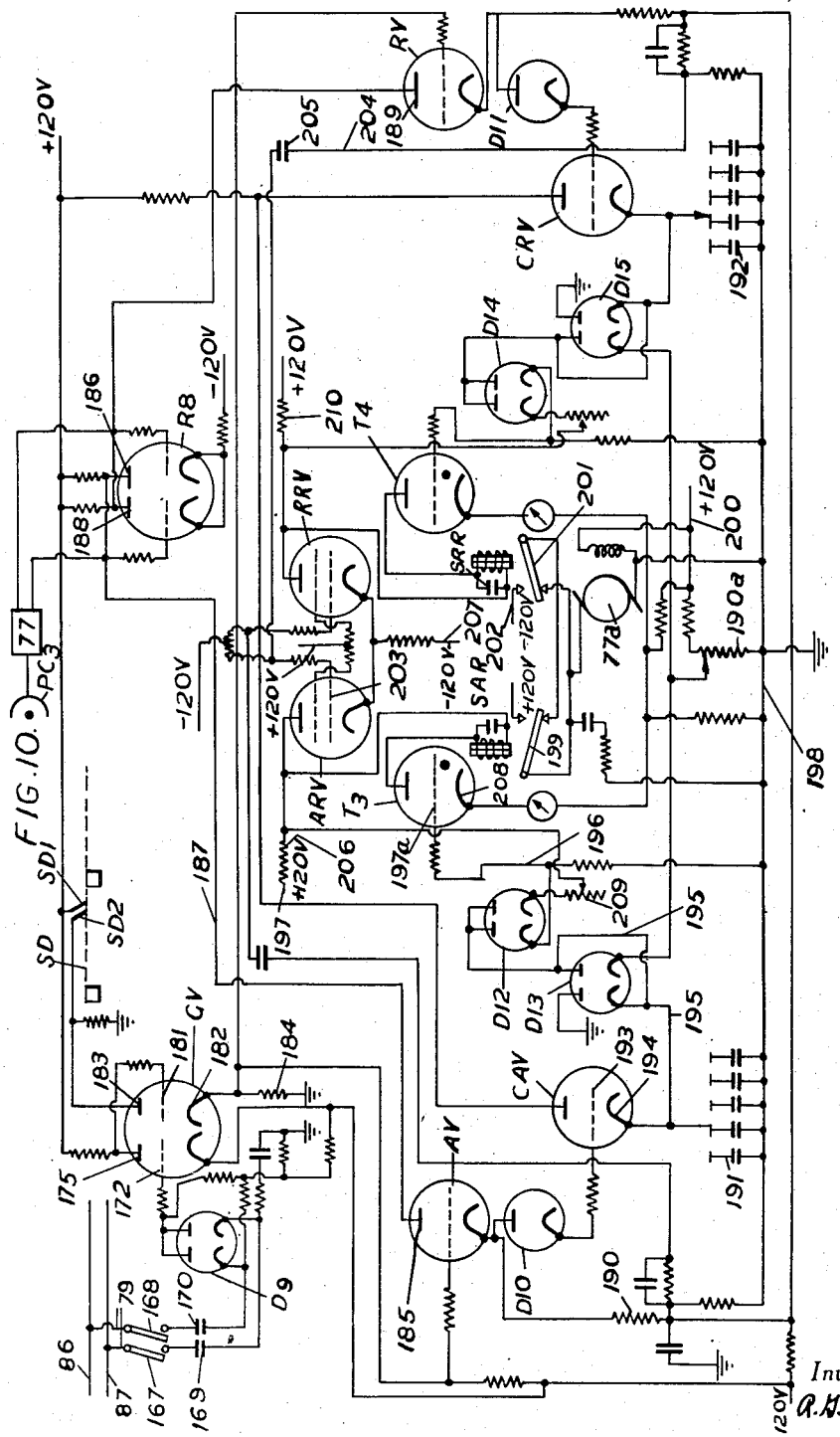

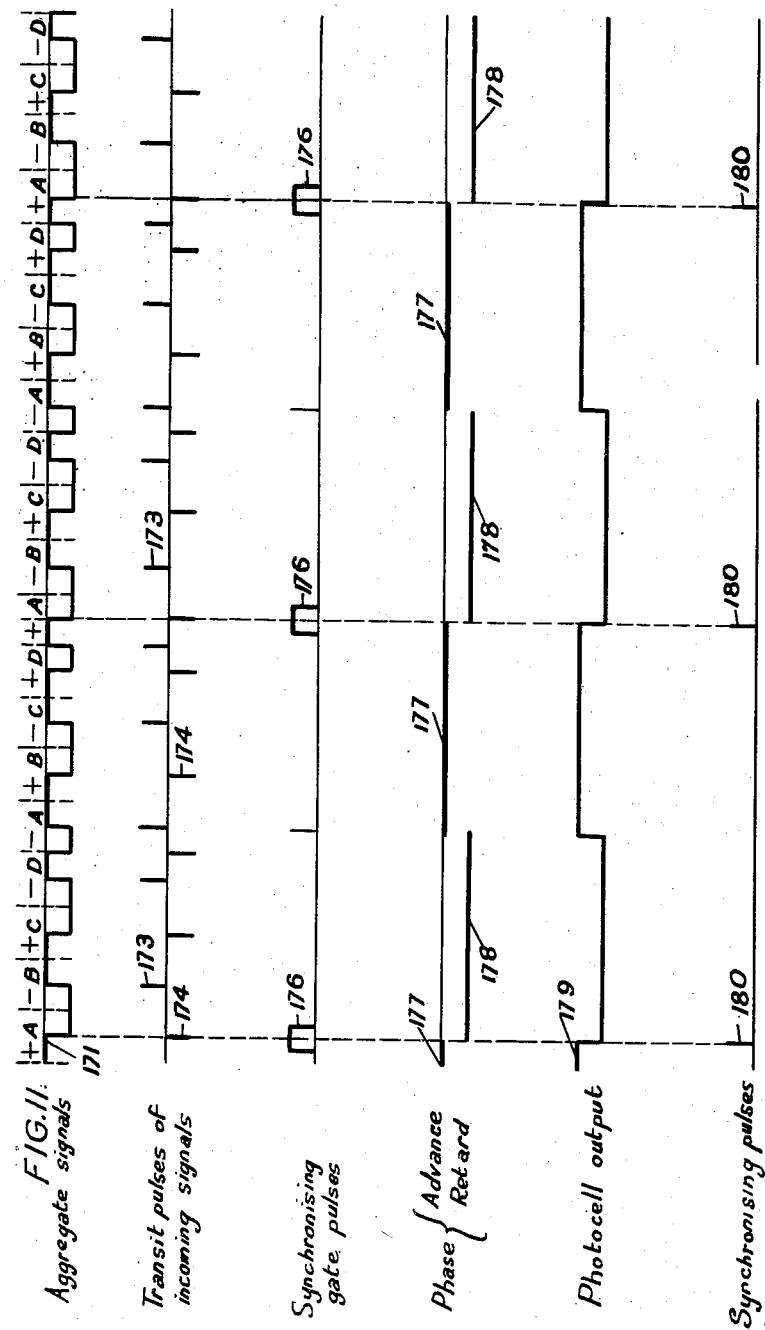

Nov. 13, 1951   R. G. GRIFFITH   2,575,268
PRINTING TELEGRAPH SYSTEM
Filed May 23, 1949   12 Sheets-Sheet 11
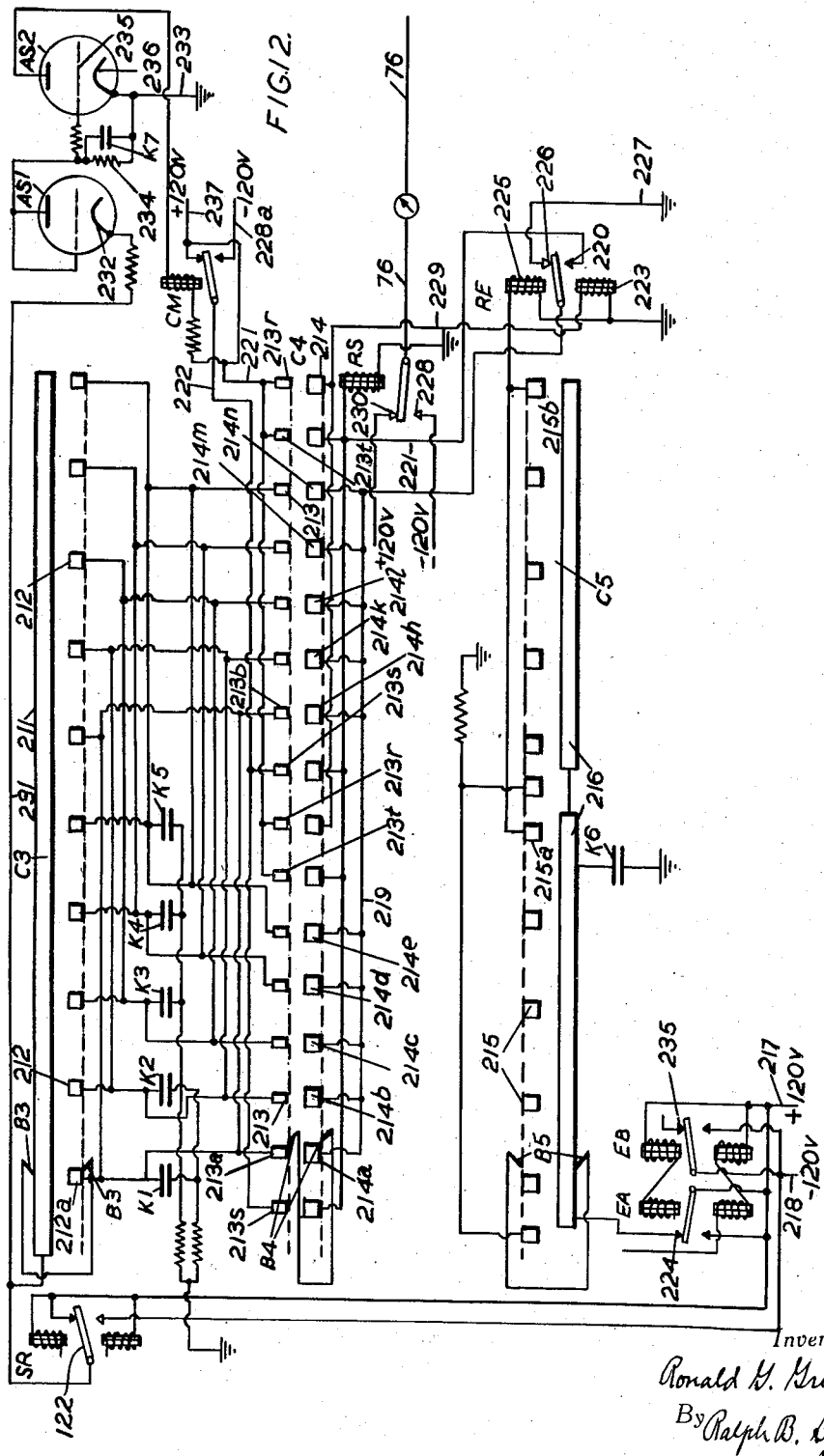
Inventor
Ronald G. Griffith
By Ralph B. Stewart
Attorney

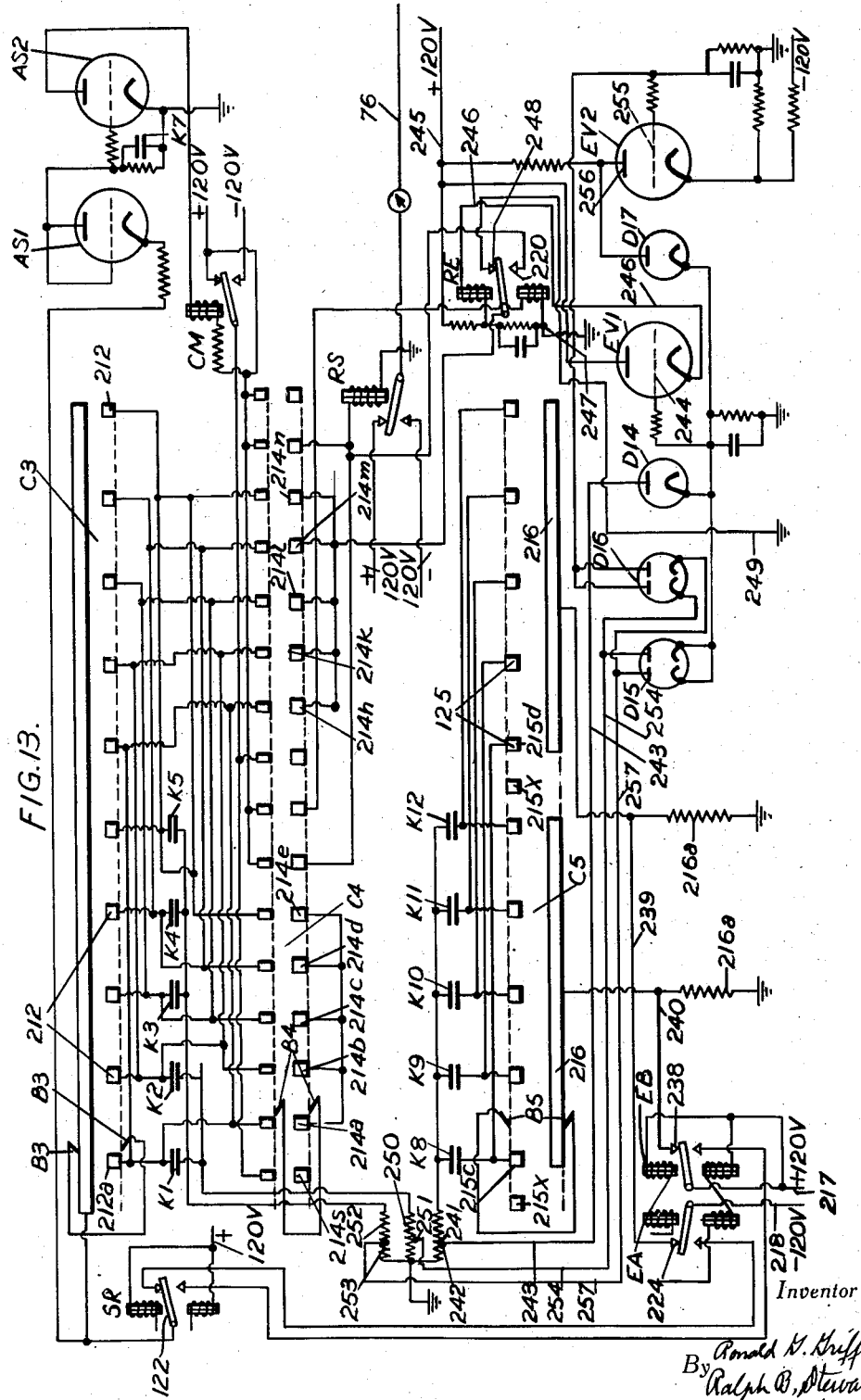

Patented Nov. 13, 1951

2,575,268

UNITED STATES PATENT OFFICE 2,575,268

PRINTING TELEGRAPH SYSTEM

Ronald George Griffith, Warlingham, England

Application May 23, 1949, Serial No. 94,862
In Great Britain May 31, 1948

46 Claims. (Cl. 178—50)

This invention relates to printing telegraph systems and particularly to systems which operate on the so-called two-position equal length codes of which the most usual is the five-unit code. In such equal length codes, each character or other signal is represented by a number of units generally referred to as marks and spaces but herein referred to as positive and negative units in order to avoid confusion with marking and spacing modulation. The five-unit code is very economical as regards the number of units employed as compared, for example, with the Morse code which requires an average of about nine units per character but it has been recognised that the five-unit code has a fundamental weakness when used on a circuit subject to interference, such as a wireless circuit, arising from the fact that the code is very liable to the transposition of characters upon a failure of any one of the units and, in fact, there is approximately an 80 per cent chance that the mutilation of a letter will result in another letter being received. This is most objectionable when messages are sent in cypher because, in that case, there is nothing to guide a receiving operator when such a transposition occurs and, consequently, such changes in characters easily pass undetected.

Various methods have been proposed to overcome this weakness, generally consisting in the use of an equal length code constructed so that all combinations contain the same number of positive and negative units with the result that, if one unit fails, the combination resulting is an unused combination and such a failure can, therefore, be readily detected.

The main object of the present invention is to enable an equal length code and particularly a five-unit code to be used with transmitting and receiving apparatus, such that the failure of a single element of modulation in that code will not pass undetected.

To that end, according to the invention, apparatus is provided for converting the positive and negative units of an equal length code into what may be called transit conditions for transmission over a telegraph line or a radio link and at a receiving station apparatus is provided for translating the received signals back into the characters in the original or primary equal length code. The transit conditions in question consist, for a positive unit, of changing the signal level in one direction and, for a negative unit, of changing back to the original signal level and, conveniently, the positive and negative units consist of reversals in opposite directions; for example, a positive signal unit may be transmitted in the form of a marking element of modulation immediately followed by a spacing element of modulation and a negative signal unit may be transmitted as a spacing element of modulation immediately followed by a marking element of modulation although it is not of great importance which of these transit conditions is assigned to the positive signal units and which to the negative signal units. It will be realised that according to the invention, signalling in the five-unit code is then effected so that the maximum length of marking or spacing modulation is limited to the time interval of two units of the signals transmitted which is a feature of great value when automatic gain control is employed to counteract variation in the strength of the received signals. The invention may be applied as a system of time division multiplex telegraphy capable of direct extension for use with start-stop telegraph printing apparatus so arranged that a failure of the modulation elements within the multiplex system is indicated on the start-stop telegraph printing apparatus.

It will be seen that each signal unit transmitted consists partly of a marking modulation and partly of a spacing modulation or vice-versa and preferably of equal lengths. Thus, a positive or negative unit in the original equal length code has to be converted into two periods of modulation, so that each character combination in the five-unit code comprises ten elements of modulation, which is a drawback when the relative keying speed is considered. However, as it is generally agreed by radio communication engineers that the use of normal five-unit code is unsafe for code traffic and is liable to degrade the service, there is at present a feeling in favour of using seven-unit working so that the present system, as regards speed, should really be compared with the seven-unit code.

A convenient method of converting signals in the equal length or primary code into the transit code used in the present invention consists in employing for a single channel or each channel of a multiplex system, a system of flip-flop connected valve combinations, each consisting of two valves or a double valve coupled to have two conditions of stability and the output of which system consists of the marking and spacing modulations according to the transit code employed in the present invention. The initial transmission may be effected by means of tape perforated in accordance with the primary code, such as the five-unit equal length code and the signals may be recorded and printed on a standard teleprinter. A pair of commutators or distributors are then employed both driven in step with a distributor for the transmitted signal units. One commutator transmits release pulses for the tape transmitter or transmitters to enable the transmitter to start at the required time to transmit the signals character by character and the other commutator provides a short interval of selection or sampling for each signal unit. The latter commutator has for each channel, a brush which collects the sample from the tape transmitter relay at the middle of each signal unit and which is connected to a neighbouring brush which passes the sample of the signal to the code converting apparatus allocated to the channel in question.

A light chopper disc and selecting pulse distributor are also driven to apply a first selecting pulse to the converting apparatus of the channel just before the sample of the signal unit is taken and a second selecting pulse just after the sample is taken. The chopper is a constantly driven disc formed with uniformly spaced slits arranged to pass light from a lamp to a photo-electric cell in sequence; the current pulses in the cell are amplified and applied to the ring of the selecting pulse distributor which passes the pulses to brushes connected to the converting apparatus of the single channel or to the apparatus of one of the channels.

The commutators or distributors and the light chopper are driven in step at appropriate speeds as will be explained more fully later, for example, from a synchronous electric motor controlled from a harmonic of a standard tuning fork.

The code converting apparatus for one channel may conveniently comprise a double triode coupled as a flip-flop, the first grid of which receives the samples of the signal units. (In Fig. 3 of the drawing, the first grid and anode are in the right hand half of tube $V_1$.) If a signal unit is positive, the first anode of the flip-flop triode is made conductive and the second anode swung to positive voltage. If the signal unit is negative, the flip-flop is changed over and its first anode becomes positive. Its second anode is connected directly to both anodes of a second flip-flop connected double triode and its first anode is connected directly to both anodes of a third flip-flop connected double triode. The first selecting pulses of the channel from the selecting pulse distributor are applied to the first grids of both the second and third flip-flop triodes and the second selecting pulses are applied to the second grids of both the second and third flip-flop triodes. The first cathode of the second flip-flop triode is connected to the second cathode of the third flip-flop triode and both are connected to the first grid of a main output flip-flop double triode preferably through a diode while the second cathode of the second flip-flop triode and the first cathode of the third flip-flop triode are similarly connected to the second grid of the main output flip-flop triode.

With this system, the conversion of normal equal length signal units into transit code signals takes place as follows:

If a positive signal unit is being sent by the tape transmitter, the first grid of the first flip-flop triode receives a positive pulse and its second anode becomes positive and remains positive and keeps both anodes of the second flip-flop valve positive until a negative signal unit is sent. The first selecting pulse is applied to the first grids of the second and third flip-flop triodes. Therefore, the first anode of the second flip-flop valve only becomes conductive and a pulse flows through it to the first grid of the main output flip-flop triode so that its first anode becomes conductive which is the condition of marking modulation. The second selecting pulse then passes to the second grids of both the second and third flip-flop triodes so that the second anode of the second flip-flop valve only is now conductive and a pulse flows through it to the second grid of the main output flip-flop triode so that the second anode of that triode becomes conductive and that is the condition of spacing modulation. Thus a positive five-unit signal unit has been translated into a transit from marking to spacing modulation.

If, on the other hand, a negative signal is being sent, the first anode of the first flip-flop triode becomes positive and renders both anodes of the third flip-flop valve positive and they remain positive until the next positive signal unit is sent. Then on the arrival of the first selecting pulse, the first anode of the third flip-flop valve conducts and passes a positive pulse to the second grid of the main output flip-flop valve which accordingly assumes the condition of spacing modulation. On the arrival of the second selecting pulse, the second anode of the third flip-flop triode conducts and passes a positive pulse to the first grid of the main output flip-flop valve which thus assumes the condition of marking modulation. Thus a negative five-unit signal unit is converted into a transit from spacing modulation to marking modulation. The main output flip-flop triode is preferably coupled to an amplifying stage and the output signals to be applied to the transmitting aerial appear across a cathode resistance in the output circuit of this stage.

The necessary receiving arrangements depend on the fact that a positive signal unit consists of a marking condition with a transit to a spacing condition and a negative signal unit consists of a spacing condition with a transit to a marking condition. In the preferred case, the marking and spacing conditions each occupy 50 per cent of a signal unit. Thus, a positive signal unit always has a mark as its first half and a negative unit has a space as its first half; therefore, if the signal units are explored or a selection made during the first half of each unit and preferably at the mid point of that half, the positive and negative units are distinguished by selecting, at those times, marks and spaces respectively. This can conveniently be arranged by applying the signals to electron valves and impressing on their grids a short selection pulse at the times mentioned, whereupon one valve will conduct for the positive signal unit and the other for a negative signal unit. Then, if the current in each valve is arranged to operate a suitable form of relay, that relay will indicate positive and negative signal units which have thus been reconverted into signal units of the primary code. This relay may consist of two valves or a double valve connected to have two conditions of stability so that one or other of the valves is made conductive on reception of a positive or negative signal unit and remains conductive until the arrival of the next selection pulse. The signal units, therefore, appear at the anodes of that valve or valves and can be utilised to control the operation of a channel output relay.

Errors may be indicated by employing a comparator circuit, similar to that just described, with valves which receive the marking and spacing conditions of the signals and a comparator flip-flop valve except that, in this circuit, the receiving valves are controlled by a second selection pulse in each signal unit which occurs preferably at the middle of the second half of each signal unit. In this case, the grids of the flip-flop valve are cross-connected with respect to the anodes of the flip-flop valve of the signal selector circuit. The result of this is that, at the time of the second pulse in each signal unit, if the signal is not mutilated, the second selection pulse renders that anode of the comparator flip-flop valve conductive which does not receive a voltage from the signal. On the other hand, if the signal is mutilated and consists of a marking condition followed by a marking condition or a spacing condition followed by a spacing condition, when the second selection pulse arrives, the voltage is applied to the anode of that valve corresponding to the grid which is made conductive; then one or other anode passes current which is rectified in a pair of valves or a double valve and passes an impulse to one grid of an error indicator valve. That valve then conducts current which passes it through the winding of an error indicating relay and thus indicates the error. This relay also has a resetting winding connected to a second anode of the error indicator valve which is rendered conductive by an error reset double valve or pair of valves connected in the same way as the comparator flip-flop valve except that its grids are cross-connected with a respect to those of the latter valve. Thus the error reset valve passes current upon the reception of a correct signal and renders the second anode of the error indicator valve conductive so that current passes through the reset winding of the error indicator relay.

These circuits are repeated for each channel so that in a four channel multiplex system, at each cycle there are four first selection pulses interspersed with four second selection pulses. These pulses are preferably set up by a synchronously driven shutter disc with narrow radial slots moved between a lamp and a photo-electric cell. The impulses so generated are distributed at the proper times to the selector and comparator circuits of the four channels through a commutator with eight brushes. The shutter disc is driven by a synchronous motor fed through a 50 cycle per second multi-vibrator circuit locked to a harmonic of a standard tuning fork and is kept in synchronism with the incoming signals. This may be effected by differentiating and rectifying the signals and applying the resulting short pulses to the grid of a gated valve, the anode of which receives volts through brushes on the commutator referred to above, at one time in each cycle. These pulses are compared with square topped waves obtained from a chopper disc driven by the synchronous motor which drives the shutter disc. The chopper disc controls light passing to another photo-electric cell, the emission from which is amplified and applied to key a pair of flip-flop valves which thus produce a square topped voltage wave at their anodes. These voltages are applied to the anodes of a further pair of valves whose grids receive the pulses derived from the signals already described. If these pulses arrive exactly at the time of change-over of the square topped waves, the last-mentioned two valves pass no current but if the signal pulses arrive before or after the change-over, one of the valves has volts on its anode and passes what may be called an advancing or retarding current impulse. These are respectively stored in condensers which ultimately trip one or other of two gas discharge valves; the anode currents of these valves energise relays which reverse a direct current shunt phasing motor which turns the stator of the synchronous motor driving the shutter disc, forwards or backwards to bring it into synchronism.

The channel output signals are synchronous signals and may be converted into start-stop signals by a channel distributor which may also prevent the passing on of a character if an error has occurred in one of its signal units. The commutator consists of two parts. The first has brushes which, through segments, store the received signal units in a series of condensers. The other part of the commutator, through other segments suitably spaced, sends a start signal followed by the units of the preceding character which are followed by the stop signal. This commutator sends on to the line relay the signals of a given character just before the signals of the next characters are stored in the condensers.

The error indicating relay is arranged, on the occurrence of an error, to energise an error resetting relay and a polarised relay. When the brushes of the second part of the commutator reach an error indicating segment after the stop signal has been sent, the polarised relay opens contacts and thus prevents the signals of the character from being sent to the line relay. When, however, a signal which is not mutilated arrives, the second part of the commutator, after sending the stop signal, makes contact with another or reset segment so that current is sent to the polarised relay to reset the latter and reestablish normal working.

In order to explain the invention more fully, a system will be considered in greater detail, by way of example, of a four-channel multiplex telegraph especially suited for used on radio channels and the transmitter and receiver will now be described with reference to the accompanying drawings in which:

Figure 3 is a circuit diagram illustrating the timing of the distributors and showing in detail the A channel converter and keyer and the main output relay; while

Figure 7 is a circuit diagram of the main parts of the receiver including the channel selector and comparator and the components for the first and second signal selection, signal comparison;

Figure 9 is a diagram illustrating the timing of the main receiving apparatus;

Figure 10 is a circuit diagram showing the method of controlling the phase of the receiving unit by means of the received signals;

Figure 11 is a timing diagram related to Figure 10;

Figure 12 is a circuit diagram of the unit for converting synchronous five-unit signals into start-stop signals; and Figure 13 is a modification of Figure 12 showing connections for repetition working.

Figure 1:
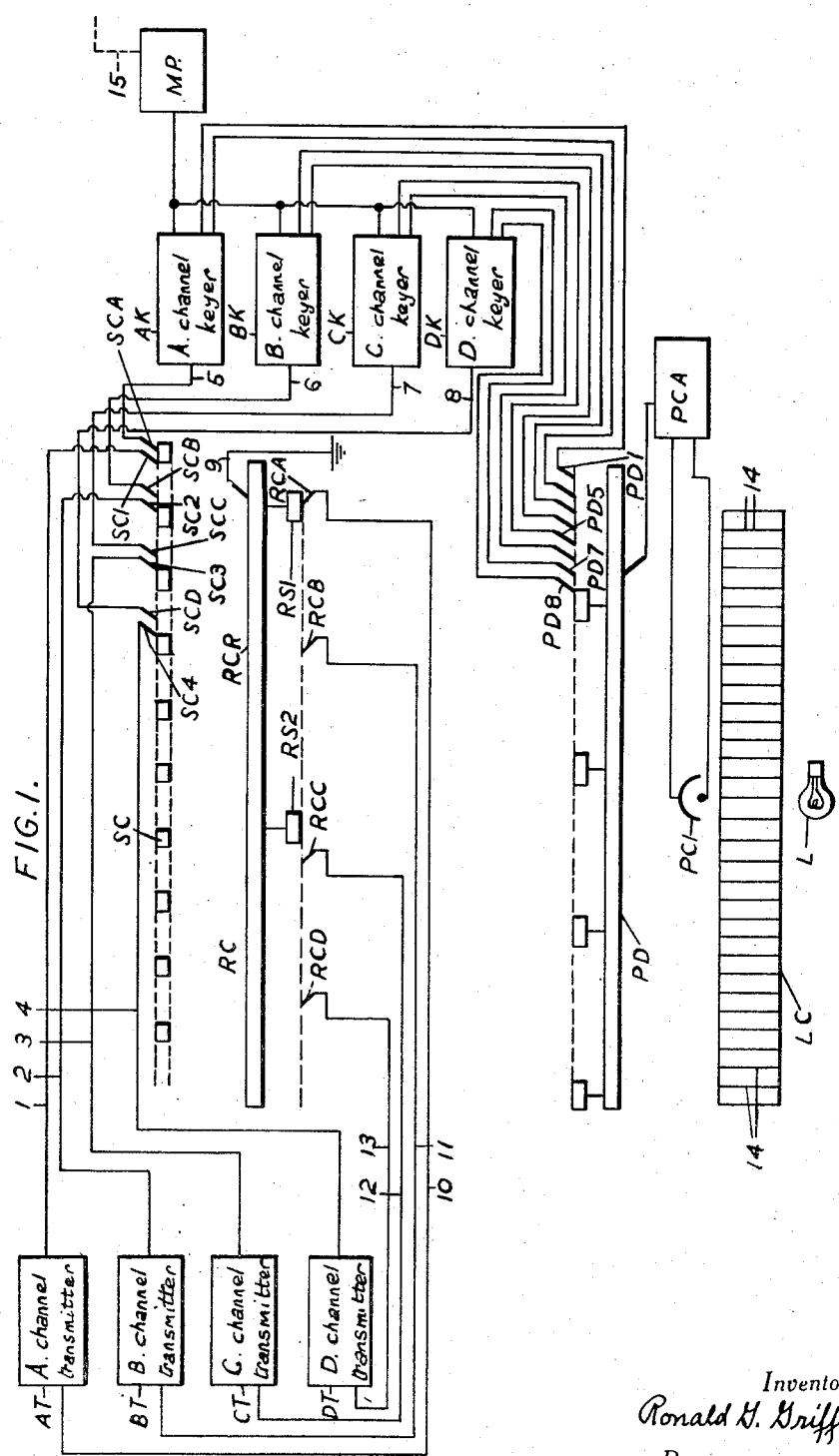
Figure 1 is a block diagram showing the transmitting arrangements.

Referring particularly to Figure 1, there is a transmitter AT, BT, CT, DT for each of the four channels and, in this example, each transmitter comprises a set of contactors controlled by paper tape perforated according to the 5-unit code and connected to an output relay at which the positive and negative signal units appear in the 5-unit code. The outputs of the four channels are supplied by conductors 1, 2, 3, 4 to brushes SC1, SC2, SC3, SC4 of a commutator SC having ten equally spaced contact segments and, by means of the commutator, the channel signals are distributed in sequence to four brushes SCA, SCB, SCC, SCD with a timing which will be described later and by way of four conductors 5, 6, 7, 8 to four channel converters and keyers AK, BK, CK and DK.

Associated with the commutator SC and rotated at the same speed is a release commutator RC the function of which is to earth through a connection 9, four brushes RCA, RCB, RCC and RCD with a timing which will be described more fully below so as to send start pulses through conductors 10, 11, 12 and 13 to release the respective tape transmitters of the four channels.

There is also a continuously driven light beam chopper or interruptor disc LC provided with thirty-two equally spaced slits 14 which permit light from a lamp L to pass for succeeding short intervals to a photo-cell PC1. The pulses from the photo-cell PC1 are amplified in a photo-cell amplifier PCA and are distributed by means of a pulse distributor PD and eight brushes PD1 to PD8, to the respective channel converters and keyers AK, BK, CK and DK with the result, as will be described more fully later, that the five unit signals are converted into transit code signals according to the invention, which are passed by way of decoupling diodes, to the main output relay shown as the component MR which feeds the aggregate signals by way of a connection 15 to a radio transmitter and aerial.

Figure 2:
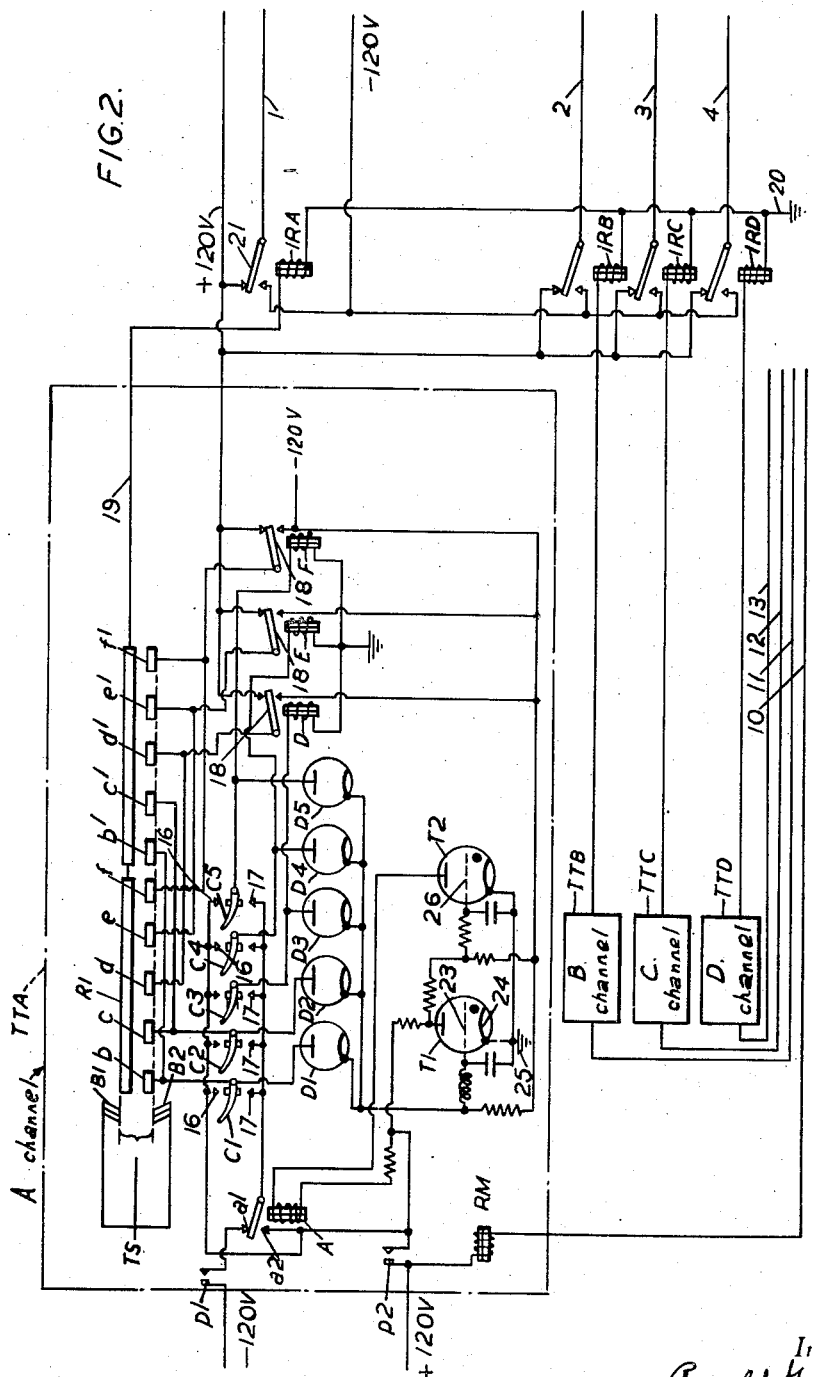
Figure 2 is a circuit diagram of the tape transmitter and its connections to the output relay in the first or A channel.

Details of the tape transmitters are illustrated in Figure 2 in the upper part of which is illustrated in detail the tape transmitter TTA for the A channel and below, the transmitters TTB, TTC and TTD for the other three channels are shown in block form but each is an exact replica of that shown in detail for the A channel. In the latter, there are the five contactors C1 to C5 corresponding to the five units of a character and having upper contacts 16 which are the respective positive contacts and lower contacts 17 which are the respective negative contacts. The movable members are controlled by peckers or the like so that when there is a perforation in the paper tape and the pecker passes through, the corresponding contactor C1 to C5 passes to its upper or positive contact 16 and when there is no perforation, the corresponding contactor is held on its lower or negative contact 17. The tape transmitter also includes a transmitting distributor TS which as shown is a half-revolution distributor so that during a half revolution of its brush mechanism B1 and B2, the five units of a signal set up by the five contactors C1 to C5, are caused to be transmitted in sequence during the half-revolution. Thus, the distributor TS has a common ring R1 engaged by the brush B1 and two sets of equally spaced segments $b$, $c$, $d$, $e$ and $f$ and $b'$, $c'$, $d'$, $e'$ and $f'$, the corresponding segments of the two sets being connected together as shown. In order to provide reasonable time for stepping the perforated tape between the reading of successive combinations, while the contactors C1, C2 are connected directly to the segments $b$, $c$, and $b'$, $c'$, the settings of the contactors C3, C4 and C5 are established on three relays having windings, D, E and F and the tongues 18 of these relays are respectively connected to the distributor segments $d$, $d'$, $e$, $e'$, and $f$, $f'$. Thus, electrical storage of the last three units of a character is established in the relays D, E and F so that immediately the brush B2 has passed over the segment $c$ or $c'$, the battery illustrated on the left of Figure 2 as +120 v. and —120 v. is cut off from the contactors at the contacts P1 and P2 which are opened at that stage by a cam (not shown) on the spindle of the distributor TS and then the tape is stepped on so that the contactors C1 to C5 are set up by the next combination perforated on the tape while the brush B2 is traversing the last three segments $d$, $e$, $f$, or $d'$, $e'$, $f'$. The tongues 18 of the relays D, E, F, then take up positions corresponding to those of the contactors C3, C4 or C5 since the relays are energised positively from battery +120 v. when each of the contactors C3, C4 and C5 are in their upper or positive positions and are energised negatively from battery —120 v. when those contactors are in their lower or negative positions.

The signals set up on the segments of the distributor TS directly from the contactors C1 and C2 and from the tongues of the relays D, E, F, are swept by the brush B1 into the conductor 19 and thence to the winding of the input relay IRA, the other side of which is earthed at 20 and as the transmitter operates with double current working, the tongue 21 of the relay IRA, on receiving a positive unit takes the upper position giving positive voltage to the input line 1 passing to the code converter apparatus and when a negative unit is transmitted, the tongue 21 takes its lower position sending negative volts to the line 1.

As already indicated, the transmitters TTB, TTC and TTD for the other channels operate in a similar way to energise the other channel input relays IRB, IRC and IRD which send the signals of the respective channels to the input lines 2, 3 and 4.

The five contactors C1 to C5 are also connected respectively through diodes D1, D2, D3, D4 and D5 to a voltage discriminator consisting of a pair of gas discharge tubes T1, T2 of the thyratron type. The diodes D1 to D5 are only provided to prevent the reverse flow of current. The tubes T1 and T2 are interconnected in a well-known way to secure the operation of a relay A when the voltage applied to the grid 23 of the tube T1 relatively to its cathode 24 has fallen to a pre-determined level. Therefore by this arrangement when all of the contactors C1 to C5 are in their lower positions, that is to say, in the negative position, a negative pulse passes from battery at —120 v., through the contacts P1, the back contact $a'$ of relay A, through the contactors C1 to C5 and the diodes D1 to D5 to the grid 23 of the tube T1. This tube is thus rendered non-conductive. Its anode potential is therefore raised, rendering the grid 26 of the tube T2 positive. The result is that the tube T2 now passes current from battery at +120 v. through the contacts P2 and the winding of relay A to earth at 25. The setting of the contactors C1 to C5 all in the negative position, of course, represents a blank combination on the perforated tape but the operation of relay A removes battery —120 v. from the contactors C1 to C5 owing to the interruption at the back contact $a'$ and, in its place, connects battery +120 v. through the front contact $a2$ to the contactors C1 to C5 so that the brushes B1 and B2 of the distributor TS will transmit five positive units instead of the five negative units or in other words, a letter shift combination is transmitted instead of the blank combination. The reason for this is that a blank combination is used to indicate a telegraph mutilation at the receiving end as will appear later and it is desirable that the blank combination should not be transmitted since that combination is set up when any blank or unperforated tape passes through the tape transmitter.

Figure 3:
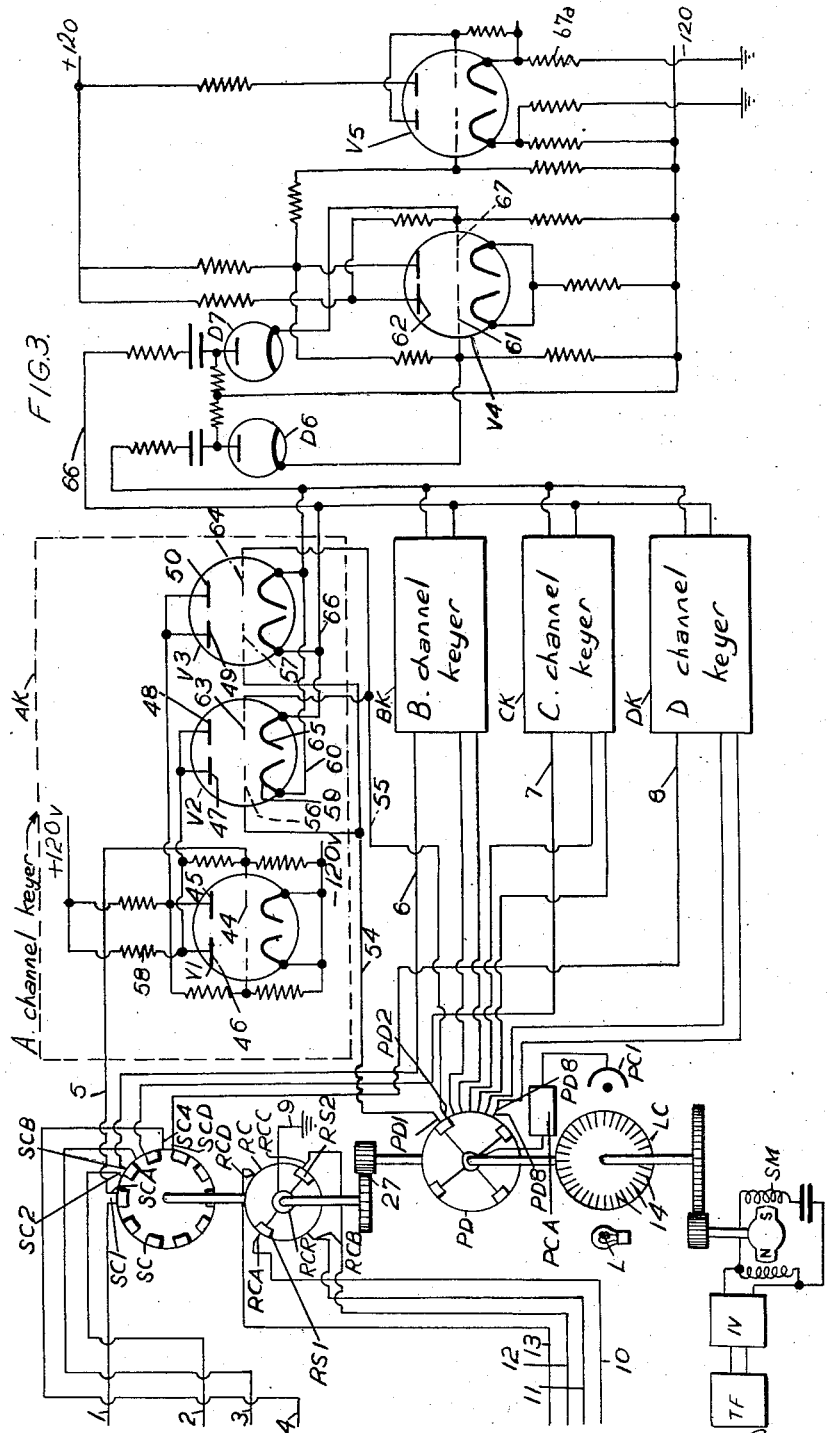

The tape transmitter is driven by an electric motor governed to a constant speed but the tape transmitter including the sprocket feed of the paper tape and also the distributor TS and its cam already referred to are normally held at rest by a normally disengaged clutch between the motor and the transmitter. The motor and the clutch are standard parts and are not shown in the drawings but, in Figure 2, there is a release magnet RM shown which is energized by the release pulses already referred to and sent out by the commutator RC (Figure 1 and Figure 3). These pulses are sent out along the conductors 10, 11, 12 and 13, the conductor 10 carrying the pulses for the A channel. The pulses pass from battery +120 v. through the winding of the release magnet RM, the conductor 10 and the commutator RC to earth at 9 and, as a result, the tape feed and the distributor TS are released in each cycle of operation, that is to say, for each stepping and reading of the perforated tape. The timing of these pulses will be explained more fully later in connection with Figures 3 and 4, but it may be said that the transmitters of the four channels are released in sequence so that the input relays IRA to IRD become effective in sequence and provide for the channelling of the signals. In the particular example under consideration, the distributor TS is driven at approximately 202 revolutions per minute, or in other words, it makes one revolution in 288 milliseconds which gives a time of 32 milliseconds per signal element or unit. The brushes B1 and B2 however, are arrested at the end of each half revolution, that is to say, between the segments $f$ and $b'$ and also between the segments $f'$ and $b$, but after a dwell of 16 milliseconds, the brushes are again released by the magnet RM. The brushes come to rest between segments $f$ and $b'$ and $f'$ and $b$, the spacing between which is half that between the other segments.

The channel signals having been applied to the conductors 1, 2, 3 and 4 as seen in Figures 1 and 2, proceed to the code converting apparatus shown in greater detail in Figure 3. The code converters are controlled by a synchronous motor SM, the electrical drive of which is provided in a generally conventional form from a tuning fork TF having a frequency of 500 cycles per second, the tenth harmonic of which is applied through an inverter IV to the synchronous motor SM which thus receives a constant frequency of 50 cycles per second and runs at a constant speed of 1500 R. P. M. The 500 frequency supply derived from the tuning fork TF, or it may be from a quartz crystal, is applied to the inverter IV which comprises an amplifier feeding into a pair of flip-flop connected gas discharge tubes having their anode circuits tuned by capacity and inductance to the frequency of 50 cycles per second. The result is that these tubes change over from one condition of stability to the other at a frequency of 50 per second which is taken off by an output coupled to their anode circuits to the motor SM. The inverter may have a relay operated by short-circuit or excessive current which changes over to cut off the supply in an emergency and can, at its front contacts, close the circuits of warning lamps.

As seen diagrammatically in Figure 3, the motor SM is geared to the chopper disc LC and the pulsing distributor PD by gearing such that the disc LC and the distributor PD are driven at a constant speed of 468.75 revolutions per minute or make one revolution in 128 milliseconds. The spindle of the disc LC and distributor PD is again geared at 27 to the spindle of the commutators RC and SC so that these rotate at a constant speed of 187.5 revolutions per minute which means that they each make one revolution in 320 milliseconds. It will be observed that these make one revolution in a time which is equal to the time that the transmitter distributor TS makes one revolution plus its rest periods. As already indicated, the commutator SC has ten equally spaced segments and therefore the distance between the centres of successive segments corresponds to the time that the brushes B1 and B2 of the transmitter distributor TS take to traverse one segment. The commutator RC has two segments RS1, RS2 (Fig. 1) equally spaced and connected to a slip ring RCR earthed at 9; the brushes, however, are spaced to give four release pulses for each half revolution and as will be explained fully with reference to Figure 4, the release pulses for the successive channels are spaced eight milliseconds apart since each channel signal element period is 32 milliseconds as determined by the distributor TS and each of the four channels has to transmit one of four equally spaced elements during that period. The brush RCA of the distributor RC is adjustable angularly to permit the time of release of the A channel transmitter to be adjusted relatively to the commutator SC to enable the selections made by the latter to occur in the middle of each signal unit. The other three brushes RCB, RCC and RCD are adjustable in the same way.

Figure 4:
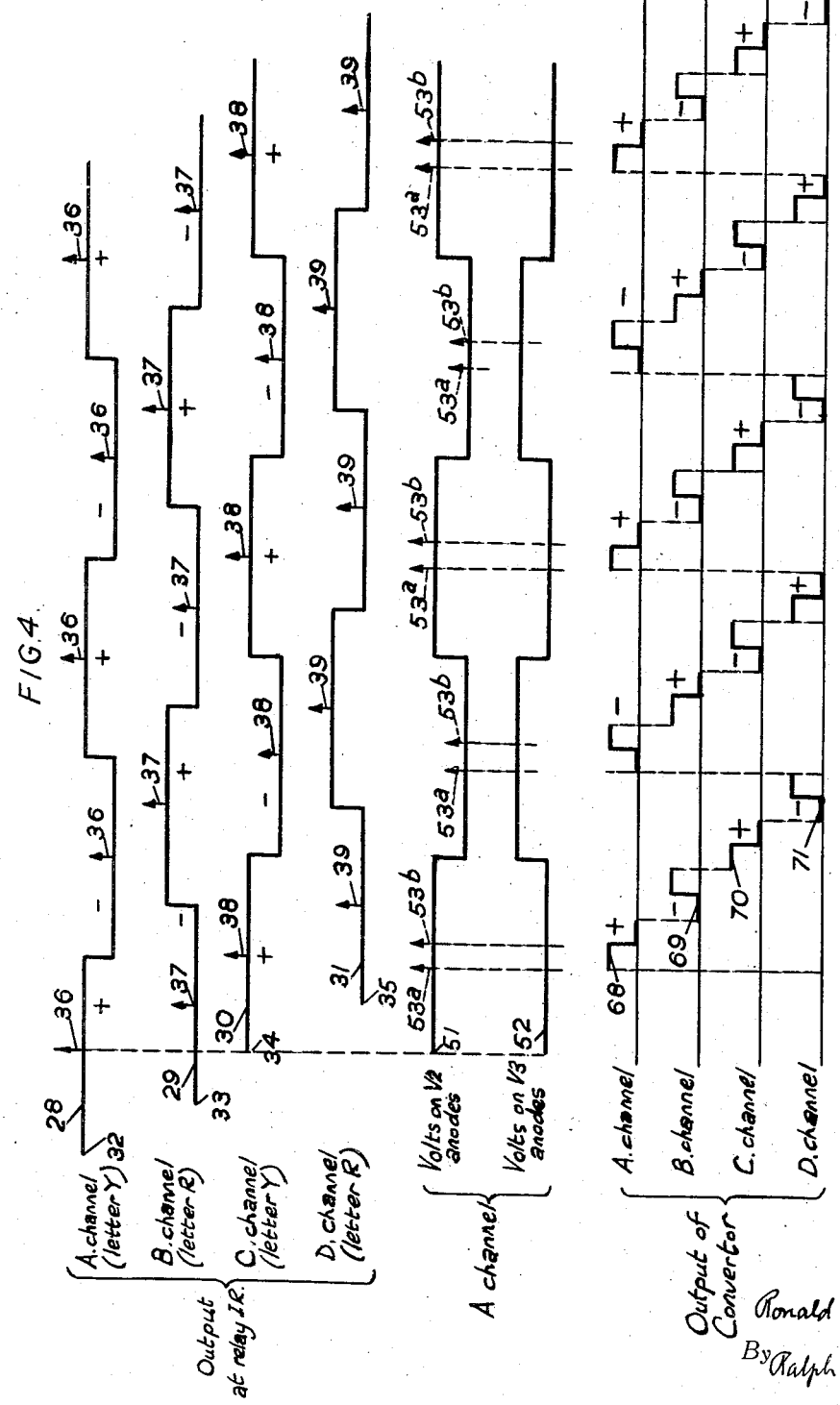
Figure 4 is a diagram illustrating the timing of the transmitter components.

The width of each segment of the commutator SC is such that each pair of the four pairs of brushes for example, brushes SC1 and SCA are bridged by a segment for approximately one millisecond and in such a phase relationship with each unit of the signals recorded on the input relay IRA, that the brushes are bridged in the middle of each signal unit. This is illustrated in Figure 4 of which some preliminary explanation is necessary. The four upper traces 28, 29, 30 and 31 show a five-unit signal for a complete character in each channel. In the A and C channels the traces 28 and 30 obviously show a signal +—+—+ which in the five-unit code is the letter Y; on the other hand the traces 29 and 31 exhibit a character —+—+— which happens to be the letter R in the 5-unit code so that these traces show a complete signal of the letter Y on the A and C channels and of the letter R on the B and D channels. These traces evidently show the signals as sent out from the input relays IRA to IRD. It will be followed from the above explanation that the release pulses sent to the release magnets RM in the four channels occur at the instants 32, 33, 34 and 35 which follow one another at intervals of eight milliseconds as already mentioned and this is determined by the spacing of the brushes on the distributor RC. In fact, the brush RCB is spaced 81 degrees from RCA, that is to say, two and a quarter signal units after RCA. The brush RCC is spaced at 198 degrees after RCA which is equal to five and a half signal units and brush RCD is spaced 279 degrees after RCA, that is to say, seven and three quarter signal units after RCA. Thus, in one half a revolution, the release pulses occur at one quarter signal unit intervals.

Now the point at which the brushes SC1 and SCA of the commutator SC are bridged is indicated by the arrows 36 and, as already mentioned, this bridging happens at the middle of each signal. The bridging of the brushes SC2 and SCB which are allocated to the B channel occurs 8 milliseconds later as indicated by the arrows 37. Similarly the bridging of the brushes SC3 and SCC again occurs 8 milliseconds later as indicated by the arrows 38 in Figure 4 and finally the bridging of the brushes SC4 and SCD occurs as indicated by the arrows 39. The spacing and setting of the brushes SC1, SCA, SC2, SCB to SCD is such as to produce this timing so that the respective pair of brushes are always bridged at the middle of a signal element in the respective channel. The interval between two successive bridgings in one channel as shown in Figure 4 between two successive arrows 36 for example, is of course, 32 milliseconds which represents the interval between the centre lines of two successive segments of the commutator SC.

It will be seen that the brushes SC1, SC2, SC3 and SC4 are connected to the conductors 1, 2, 3, 4 respectively whereas the brushes SCA, SCB, SCC and SCD pass respectively to conductors 5, 6, 7 and 8 which pass to the keyers AK to DK of the respective channels. Thus, the function of the commutator SC is so to speak, to sample each of the five-unit signal elements for a period of 1 millisecond approximately at the middle of the element in question and to pass that sample on to the keyer of the respective channel.

The conductor 5 from the brush SCA passes to the right hand grid 44 of a double triode valve V1 the two parts of which are connected as a flip-flop electronic relay. Thus, if the incoming signal unit is positive, the grid 44 is rendered positive, and the right-hand anode 45 becomes conducting and the left hand anode 46 non-conducting whereas the condition is changed over in the case of a negative signal unit. In other words, the signal recorded on the input relay IRA is transferred to the valve V1 in the definite phase relation indicated above with reference to Figure 4. In the A channel as explained with reference to Figure 4, the grid 44 receives a sample signal every 32 milliseconds so that the signals on the valve V1 have a fundamental element of modulation of 31.25 bauds. It will be observed that the left hand anode 46 of the valve V1 is connected directly to the two anodes of another double triode V2 whereas the right hand anode 45 of the valve V1 is connected directly to the two anodes of yet another double triode V3 so that when a positive signal unit is received on the A channel and the voltage of anode 46 becomes positive, the two anodes 47, 48 of the triode V2 remain positive until a negative signal unit is received and renders the anodes negative again. As soon as a negative signal unit is received, the anode 45 becomes positive so that the anodes 49, 50 of the valve V3 then remain positive until another positive signal unit is received. This is illustrated in Figure 4 by the traces 51 and 52 which represent respectively the variation in voltage on the anodes 47 and 48 and on the anodes 49 and 50 when the signal indicated by the trace 28 is received on the A channel. The voltage of the anodes 47 and 48 becomes positive as shown at 51 when the brushes SC1 and SCA are bridged and the relay IRA is in the positive position so that this condition commences at the middle of the signal unit 28. During the same time, the trace 52 is negative and as the negative and positive signal units are received in succession, the voltages on the two pairs of anodes, reverse as shown by the traces 51, 52.

As previously stated, the chopper disc LC interrupts a light beam from the lamp L to produce pulses in the photo-electric cell PC1 equally spaced due to the slits 14. There are 32 slits and the disc LC as already mentioned makes one revolution in 128 milliseconds so that the pulses follow one another at intervals of four milliseconds. These pulses occur on either side of the middle points of the signal units as represented by the voltages on the anodes 47, 48 and 49 and 50. These pulses for the A channel are represented in Figure 4 by the arrows 53a, 53b where it can be seen that the pulses occur two milliseconds before and two milliseconds after the middle of the signal unit appearing as the voltages on the anodes of the double triode tubes V1 and V2. The pulses are fed into the common ring of the commutator PD (Figure 3) so that they are distributed to the chanel keyers for which purpose, the brushes PD1 to PD8 are suitably spaced. Thus, in the A channel, the brushes PD1 and PD2 are connected to the valves V2 and V3, the brush PD1 being connected by a conductor 54 to the left hand grids of both the valves V2 and V3 and the brush PD2 being connected by a conductor 55 to the other grids of those valves. The brushes PD3 to PD8 are similarly conected to the keyers BK, CK and DK of the other three channels in the way shown in Figure 3.

The code conversion is effected by the valves V2 and V3 in the following manner. Assuming that the valve V1 is receiving a positive signal unit so that the right half of the valve is conductive, this will place a negative voltage on the anodes 49, 50 of the valve V3 and a positive voltage on the anodes 47, 48 of the valve V2. Now the first selecting pulse from the brush PD1 arrives on the left hand grids 56 and 57 of the valves V2 and V3 and consequently the only path effective or conductive in these valves V2 and V3 at this moment is that of the left hand anode 47 of the valve V2. This causes a positive pulse to pass from battery +120 v. through resistance 58, anode 47, cathode 59, conductor 60, diode D6 to the left hand grid 61 of a double triode valve V4 which is a flip-flop connected valve forming part of the main output relay. This positive pulse represented at 53a in Figure 4 makes the left hand anode 62 of the valve V4 conducting which gives the marking condition. The second pulse arriving from the brush PD2, as shown at 53b in Figure 4, four milliseconds after the first pulse came from the brush PD1 applies positive voltage to the right hand grids 63, 64 of the valves V2, V3, but as only the valve V2 has positive voltage on its anodes, it is only the right half of the valve V2 which is effective and its anode 48 conductive and then a positive pulse passes from battery +120 v. through the resistance 58, anode 48, cathode 65, conductor 66 through the diode D7 to the right hand grid 67 of the valve V4 so that this second pulse turns over the valve V4 to the spacing condition. The valve V5 inter-connected with the valve V4 is provided as an amplifying stage with its output appearing across the right-hand cathode resistance 67a.

The keyers BK, CK, and DK in the other three channels are similar to those shown at AK and produce similar effects on the valve V4 at the correct instants so that as the commutator PD rotates and engages the brushes PD1 to PD8 to supply the first and second selecting pulse to all the keyers in turn, the valve V4 records an aggregate of the converted signals having a fundamental element of modulation of 4 milliseconds or in other words, 250 bauds. In Figure 4, in the last four traces 68, 69, 70 and 71, the signals in each of the four channels A to D are shown separately for clearness in their correct phase relations as produced from the signals shown in traces 28, 29, 30 and 31. It will be realised, however, that if these four traces were combined to a single level, the resulting trace would show the aggregate of the converted signals transmitted by the valve V4, and, in fact, is shown in the top trace in Figure 9.

It will be understood, of course, that the system is in no way limited to time division multiplex operation because if it is preferred to work with a lower maximum keying speed, it may be arranged for only two or even one of the keyers AK to DK to control the main output valve V4. This can be effected, for example, by providing each of the channels with a main relay such as V4, V5 and using selecting pulses separated by four divides; that is to say, for example, by using the brush PD8 for the first selecting pulse and PD4 for the second, the A channel keyer AK could be operated at single channel speed or it could be operated at the four channel speed as previously described by using the distribution brushes PD1 and PD2.

Figure 5:
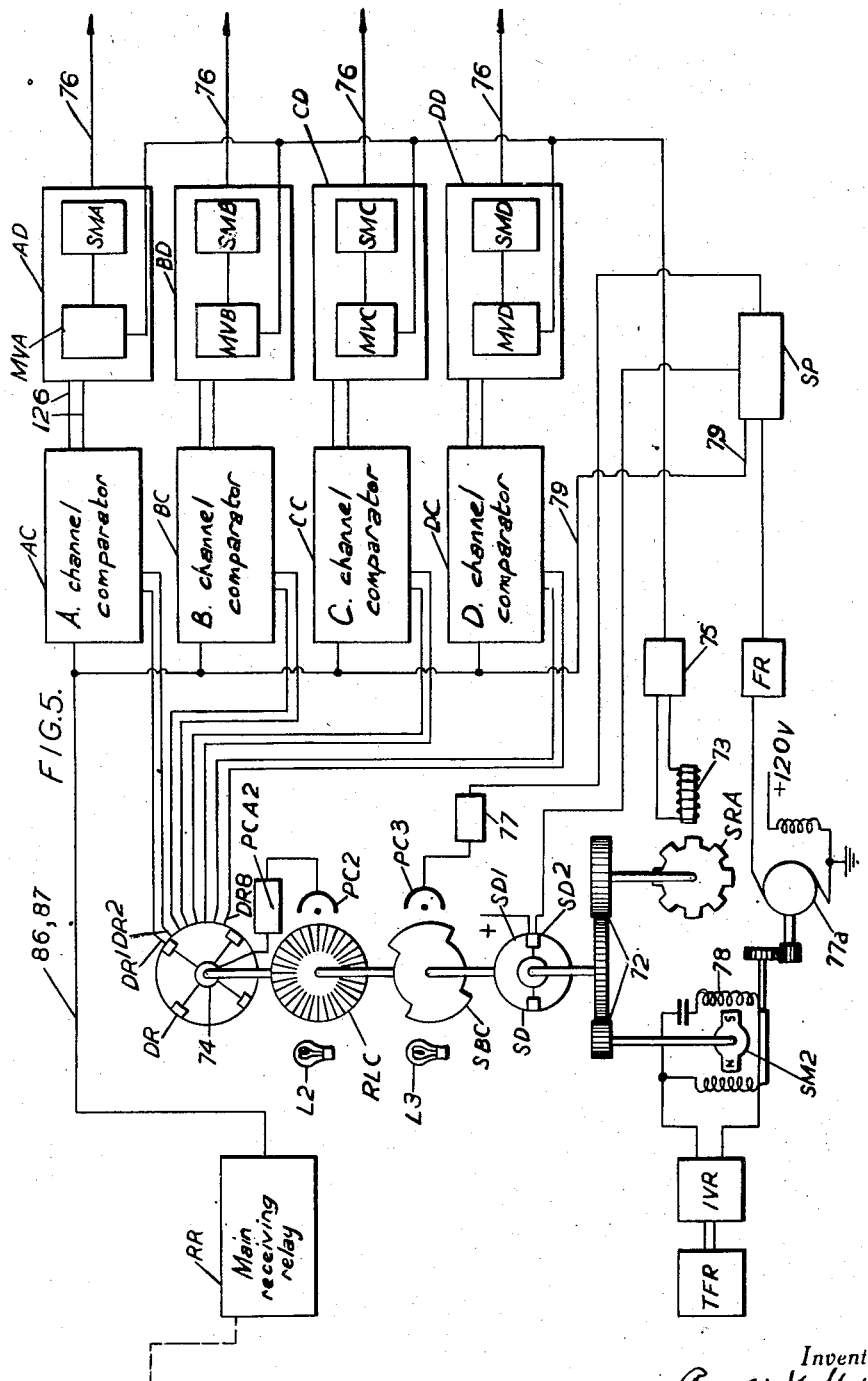
Figure 5 is a block diagram showing in general the components of the receiver.
Figure 6:
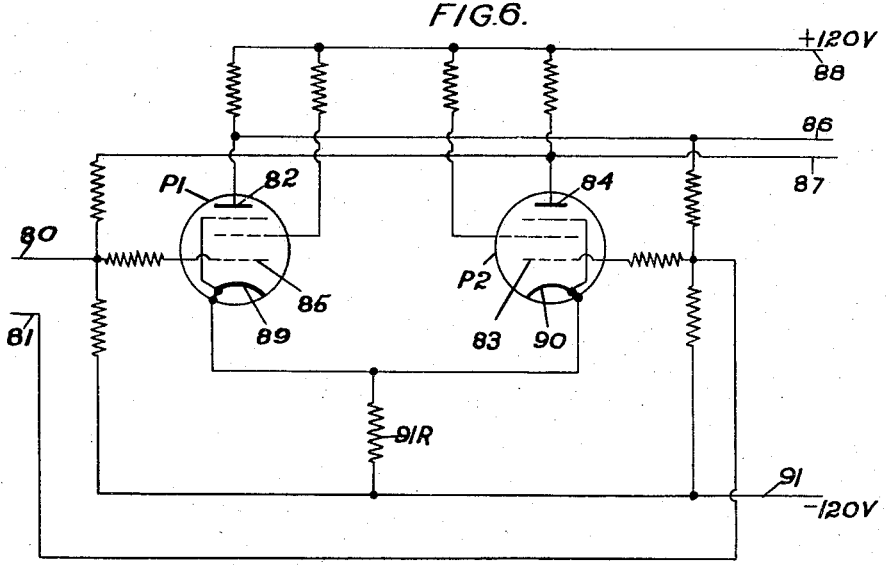
Figure 6 is a circuit diagram of the main receiving relay.

Referring now to Figure 5, the signals from a radio receiver are passed to a main receiving relay RR shown in detail in Figure 6 and the output from that relay is connected by conductors 86, 87 to the four channel comparators AC, BC, CC and DC. The main receiving unit includes a synchronous electric motor SM2 arranged to drive in a fixed phase relation a selecting base light beam chopper disc RLC, a selecting base distribution commutator DR, a synchronizing base light beam chopper SBC, a synchronizing distributor SD and a channel distributor synchronizing alternator SRA. This last component is geared to the motor SM2 at 72 so that an alternating current of 50 cycles per second is generated in the alternator winding 73. The other four members RLC, DR, SBC and SD rotate at the same speed as the chopper LC in the transmitter shown in Figures 1 and 3, that is to say, at 468.75 revolutions per minute. Therefore the chopper disc RLC interrupts the light from a lamp L2, 32 times per revolution, that is to say, once every four milliseconds. The chopper RLC also has a photo-cell PC2 similar to the photo-cell PC1 connected through an amplifier PCA2 so as to apply the selecting pulses to the common ring 74 of the commutator DR. The amplifier PCA2 is, in general, a conventional two-stage resistance capacity coupled high gain amplifier shown in greater detail in Figure 7. Each of the pulses thus applied to the ring 74 has a duration of approximately 250 microseconds at a voltage when connected to a high resistance load of about 90 to 100 volts positive. The commutator DR is so arranged that the selecting pulses occur theoretically at the middle of each element of modulation of the aggregate signals as will be explained more fully later in connection with Figure 9.

The commutator DR clearly passes pulses in turn to eight brushes DR1 to DR8 and two of these brushes are connected to each of the channel comparators AC to DC. Thus, the brushes DR1 and DR2 are connected to the comparator AC of the A channel. Each brush DR1 to DR8 is in contact in turn with a commutator segment for approximately two milliseconds and actually the path for any selecting pulse through one of the segments of the commutator DR is established before the pulse is generated by the disc RLC so that any slight irregularity of contact with the brushes does not affect the shape of the selecting pulse.

All of the components will be described in detail later but it may be mentioned that each channel comparator AC to DC is connected to a channel distributor AD to DD, each of which comprises a multi-vibrator MVA . . . MVD fed from the alternator winding 73 through a 50 cycle amplifier 75 and also comprises a 50 cycle synchronous motor SMA to SMD. The channel distributors AD to DD deliver through conductors 76 which are the respective teleprinter lines. As already indicated, the disc SBC is a synchronizing base chopper and controls a light from a lamp L3 to a further photo-electric cell PC3 and the resulting pulses are amplified at 77 and are passed to a synchronizing panel SP which controls a field reverser FR for regulating a direct current shunt motor 77a. The motor 77a is geared to the stator 78 of the synchronous motor SM2 so as to turn it in either direction to correct the phase of the components driven by the motor SM2 in dependence upon the received signals which are passed to the synchronizing panel SP through a conductor 79.

The main receiving relay RR is shown in detail in Figure 6. Signals from the radio receiver may be passed to this relay on a single wire or two wires, as convenient, in the form of direct current reversals. However, in the present example, the positive signal elements apply positive signals to the conductor 80 and negative signal elements apply similar signals to the conductor 81. The relay RR comprises two pentodes P1 and P2 which are connected as a dead beat multivibrator, the anode 82 of the valve P1 being connected to the input grid 83 of the valve P2 and the anode 84 of the valve P2 being connected to the input grid 85 of the valve P1. The anode voltages of these valves appearing in the conductors 86, 87 provide a two-wire signal output. The anodes 82 and 84 are supplied from a source +120 v. at 88 and it will be observed that the cathodes 89 and 90 are connected through a resistance 91R to a source —120 v. at 91 so that a full 240 volt high tension supply is applied to this relay. The circuit is so arranged that when the incoming signal is a positive element applied to the grid 85 of the valve P1, the latter becomes conducting and owing to the reciprocal connection, the valve V2 is substantially non-conducting. In this condition, the anode voltage of the valve P1 falls to approximately 75 volts negative and that of the valve P2 is approximately 100 volts positive. Similarly an incoming negative element causes the potential of the anode 82 to become approximately 100 volts positive and that of the anode 84 to drop to about 75 volts negative. Thus the voltage on the conductor 87 is about 100 volts positive and that on the conductor 86 about 75 volts negative for one condition which reverses to set up the other condition of modulation of the incoming signals. These signals are, of course, in the form of transit code signals and for the sake of clarity, they are shown in the top trace 92 in Figure 9. This trace represents the aggregate signals and by comparison with Figure 4 it will be seen that the same example has been taken as for the transmitter, viz. letter Y in the A and C channels and letter R in the B and D channels. In fact it will be seen that the trace 92 is a combination of the traces 68, 69, 70 and 71 at the foot of Figure 4; it thus represents the change with time of the voltages on the conductors 86 and 87, the high level of the trace 92 representing about 100 volts positive and the low level about 75 volts negative. The coupling and breakdown resistances shown in Fig. 6 are according to normal practice and need not be referred to in detail.

The two wire output 86, 87 of the main relay is connected to all four channel comparators AC to DC as seen in Figure 5 and the reference numerals 86, 87 are applied to the connection in that figure also.

In Figure 7, the circuit connections of the comparator for one channel are shown in detail. It may be assumed that this is the A channel. The conductors 86, 87, applying the output of the main relay appear at the left of Figure 7 and proceed to what may be termed the first signal selection section. This section comprises two gate triodes GM and GS and a double triode R1. These three valves serve as a storage stage. The double triode R1 is connected as a dead beat multivibrator or flip-flop with two conditions of stability and in each of these conditions, one anode 93 or 94 is approximately at 45 volts negative and the other at approximately 120 volts positive relatively to earth. Both anodes are supplied from the +120 v. line 88 and the cathodes are connected to the −120 v. line 91. During the operation, the voltage of the cathodes 95, 96 varies between about 55 and 60 volts negative.

The anode 84 of the pentode P2 of the main receiving relay is connected by conductor 87 to the anode 97 of the gate valve GM so that during all marking signal elements received in the aggregate signals, the anode 97 is at about 110 volts positive; the anode 82 of the pentode P1 is connected by conductor 86 to the anode 98 of the gate valve GS so that all spacing signal elements of modulation in the aggregate signal are set up as positive voltage on the anode 98. The grids 99, 100 of the valves GM and GS are connected respectively through resistances 101, 102 to the first brush DR1 of the commutator DR so that these grids both receive what has been called the first selection pulse obtained from the photo-cell PC2 under control of the chopper disc RLC as described with reference to Figure 5.

In passing, the amplifier PCA2 is shown in detail in Figure 7. This has been already referred to but it may now be pointed out that it consists of a triode AT, resistance-capacity coupled to a pentode AP, the input to the grid 103 of the valve AT being derived from the photo-cell PC2 which has a source +90 v. applied to its anode and the output from the pentode AP is connected to the brush 104 bearing on the common ring 74 of the commutator DR. The anodes of the valves AT and AP are supplied from the +120 volt source and their cathodes are connected to the −120 v. terminal of the source.

Resuming the operation at the stage at which the first selection pulse from the brush 104 has passed through the brush DR1 to the grids 99, 100 of the valves GM and GS, the timing is such that these selection pulses occur approximately at the middle of each first signal element and are indicated in Figure 9 by the longer arrows marked l. For the sake of clearness, the trace 92 has been divided into sections marked with the letters ABCD indicating the time intervals allocated to the different channels. The symbols +− indicate whether the signal units are positive or negative in the transit code.

The pulse indicated by the long arrows l makes the grids of both valves GM and GS positive and renders both valves conductive. It will be recollected, however, that if the signal element received is a marking element, the anode 97 is positive and the anode 98 is negative. This condition, of course, is represented in Figure 9 by the first signal unit in the A channel in trace 92 which is positive in the transit code so that its first element is marking. Under these conditions, the valve GM conducts and the voltage on its cathode 105 rises to about 75 volts positive for the duration of the selection pulse. This voltage is applied to the left-hand grid 106 of valve R1 making its left anode 93 conducting which is the condition of the valve R1 corresponding to a positive signal element. At the end of the selection pulse, the voltage of cathode 105 falls to about 40 volts negative leaving, however, the grid 106 of the valve R1 positive relatively to its cathode 95. Nothing further happens to the valve R1 until the first element of the next signal belonging to the A channel is recorded on the main relay and this will occur with the next first selection pulse on the A channel, in fact, at the time of the arrow la in Figure 9 which, it will be recollected, is 32 milliseconds after the first selection pulse just discussed.

It will be appreciated that under the above conditions, the voltage of the cathode 107 of the valve GS is approximately 75 volts negative so that the right hand grid 108 of valve R1 is negative relatively to its cathode. Consequently, should the next signal on the A channel be negative as it happens to be at the time of the pulse la in Figure 9, the anode 98 of the valve GS is at about 110 volts positive when the first selection pulse la is applied. Then the flip-flop valve R1 is keyed to its condition to set up the negative signal element. In Figure 9, this is illustrated in the trace 108a which shows the resulting signals in the A channel established at the anodes of the flip-flop valve R1. It will be recognised of course, that the ordinary five-unit signal for the letter Y is thus obtained at the receiver and in fact the trace 108a corresponds precisely to the trace 28 in Figure 4. Three other traces 109, 110, 111, could be prepared in precisely the same way to show what would occur at the R1 valves in the comparators of the B, C and D channels when receiving the signals shown in the trace 92. The long arrows l showing the first selection pulses in the successive channels are spaced apart by four milliseconds as the brushes DR1, DR3 and DR5, DR7 of succeeding pairs come into play as can be seen clearly from Figure 5 and also from Figure 7, although, as the latter figure is only concerned with the A channel, only brushes DR1 and DR2 are shown connected.

It will be appreciated that this result is obtained by the apparatus disclosed because the first element of any transit signal as employed in the present instance, is of the same sign as that of the five-unit signal unit of the tape transmitter. This is quite obvious from Figure 4 which shows in the lower part that the first element of a positive signal unit in the transit code is marking and the first element of a negative signal in that code is spacing, that is to say, each is of the same sign as the original signals shown in the upper four traces in Figure 4. Thus, provided no mutilation has occurred, the valve R1 will set up on its anodes five-unit signals identical with those at the input transmitter and as appears in Figure 9, the duration of each signal element as seen at 108a is 32 milliseconds so that the five-unit signals in the receiver have a fundamental speed of 31.25 bauds.

In carrying out the present invention, it is arranged to compare the first element of a signal with the second element immediately following and in the system described, the signals set up on the anodes of the valve R1 are passed out with delay until such comparison is made. The second selection pulses indicated by the short arrows 2 in Figure 9 are utilised to provide this delay by controlling a pair of gate valves R2, R3 and an output relay valve R4 in the following manner. Assuming as before that a marking signal element is set up on the anodes in the valve R1, the left anode 93 will be at 45 volts negative approximately and the right anode 94 at 120 volts positive approximately.

The anodes 93, 94 of the valve R1 are connected to the anodes 112, 113 of the valves R2, R3 by the conductors 114, 115. The valves R2 and R3 are connected as cathode followers, the valve R2 dealing with marking signal elements and the valve R3 with spacing signal elements. Now the second selection pulse of the A channel derived from brush DR2 is applied to the grids 116, 117 of valves R2 and R3 so that at the instant the second selection pulse occurs, as the anode 112 is at 120 volts positive, the voltage of its cathode 118 rises and the left-hand anode 119 of the valve R4 is rendered conductive and that valve is locked in that condition because of the deadbeat flip-flop connection of its two halves. Consequently current flows from the source 120 V. at 120 through the upper winding 121 of a double wound relay SR and through the anode 119 of the valve R4. The relay SR is therefore energised to move its tongue 122 to the upper or positive contact as shown in Figure 7. Similarly when the signal element is spacing, the cathode 123 of the valve R3 has its voltage raised so as to render the right hand anode 124 of the valve R4 conductive in which case current passes through the lower winding 125 of the relay SR, the tongue 122 of which is drawn down to the lower or negative contact. Thus, the relay SR sends out to the teleprinter line 126 signals on the A channel as represented by the trace 108 in Figure 9 and corresponding relays on the other three channels, send out signals as shown by the traces 109, 110 and 111, or, in other words, the conditions of the valve R1 are transferred to the output relay SR as five-unit signals.

It may be mentioned that since, when working with four channels, the second selection indicated by a short arrow 2 in Figure 9 occurs only four milliseconds after the first selection indicated by the long arrow 1, it may be doubted whether the complication arising from the addition of the valves R2, R3 and R4 is really necessary. As a matter of fact, it would be hard to justify this complication with four-channel working, but as the equipment is designed to be easily switched for two or even single channel working when radio conditions are very bad, it is deemed desirable to include this provision for storage since it should be remembered that with double channel working the comparison takes place eight milliseconds after the first selection pulse and in the case of single-channel working 16 milliseconds after the first selection pulse.

The part of the circuit for signal comparison is arranged to check the first element of modulation of a signal unit against the immediately following element of the same unit and according to whether the result indicates a mutilation or a correct signal, to control an error indicating relay. Actually in Figure 7, two error indicating relays EA, EB are shown with their windings connected in series for a reason which will appear later. A double triode R5 is provided to indicate a mutilation or incorrect signal and another double triode R6 to indicate a correct signal. A pair of triodes HM and HS similar to the valves GM and GS are provided and on the reception of a positive element of modulation in the aggregate signals, a positive voltage is applied to the anode 127 of the valve HM which is connected directly to the line 87 and similarly the reception of a negative element of modulation places a positive voltage on the anode 128 of the valve HS since it is connected directly to the line 86. So far the valves HM and HS are therefore connected in the same way as the valves GM and GS. The second selection pulse in the A channel derived from the brush DR2 is applied by the conductors 129, 130, both to the grid 131 of the valve HM and to the grid 132 of the valve HS so that in the valve which at the time has positive voltage on its anode, current will flow through the valve from anode to earth and through a cathode resistance 133 to set up a voltage on the cathode 134 or 135.

The cathode 134 is connected directly to the left anode 136 of the valve R5 and the left anode 137 of the valve R6 both of which are connected as cathode followers. The two cathodes 138, 139 of the valve R5 are connected to earth through separate resistances 140 so that as will be described below, fading and noise on the radio link can be distinguished. The outputs of the cathodes 138, 139 however, are combined by connecting the cathodes to the anodes 141 of a double diode D3, the cathodes 142 of which are connected together and the cathode volts of the valve R5 are thus passed to the left-hand grid 143 of another double triode R7 to control the error indicating relays EA, EB in the manner described below.

The valve R6 has its cathodes 144 connected together so that when this valve has a voltage on its cathodes which happens whenever a first element of modulation is proved to be correct, the voltage of the cathodes 144 is applied by a conductor 145 to the right grid 146 of the valve R7 which thus passes current on its right side from the source +120 v. at 147 through the upper windings of the relays EB and EA, the right anode 148 of the valve R7 and its right cathode 149 to the earth line 150. The tongues of the relays EA and EB unless they are already in the upper position, are moved into that position which is the position not indicating any error.

It will next be observed that the left grid 151 of the valve R5 is connected by a conductor 152 to the right anode 94 of the valve R1 and the right grid 153 of the valve R5 is connected by a conductor 154 to the left anode 93 of the valve R1 while, on the other hand, the left grid 155 of the valve R6 is connected to the left anode 93 of the valve R1 and the right grid 156 is connected to the right anode 94 of valve R1.

Now as already explained, on reception of a positive element of modulation, the right anode 94 of the valve R1 receives about 120 volts positive from the cathode 105 of the valve GM. Therefore the left grid 151 of valve R5 and the right grid 156 of valve R6 are then also at this positive potential. Now, as the first element of modulation in the signal was positive the second element should be negative and then the valve HS has positive voltage on its anode 128, whereas the valve HM will have negative voltage on its anode 127 at the time the second selection pulse is applied to their grids 131, 132 from the brush DR2. Therefore the valve HS is conducting and has a voltage on its cathode 135 which is applied to the right anode 157 of the valve R5 and the right anode 158 of the valve R6.

As already mentioned, the first selection pulse sets up positive volts on the right hand grid 156 of the valve R6 and on the left hand grid 151 of the valve R5. However, while the valve R5 has positive volts on its left-hand grid 151 upon the arrival of the second selection impulse, it has positive volts on its right-hand anode 157 and therefore remains inoperative. The valve R6, however, has positive volts on its right-hand grid 156 and on its right-hand anode 158 so that the latter passes current and volts are set up on its cathodes 144 and are applied to the grid 146 of the valve R7 so that, as already explained, the anode 148 is conductive and current passes through the upper windings of the error indicating relays EA and EB which give an indication that the signal unit is correct.

It will be realised that when the valve R7 is changed over by the grid 143 receiving a positive voltage from the cathodes of the valve R5 through the diode D8, current flows in its left anode 159 passing through the lower windings of the relays EA, EB which are thus operated to indicate an error or mutilation.

This last result arises as follows: Assuming as before that the first element of modulation of a signal unit is marking, the left-hand grid 151 of the valve R5 and the right-hand grid 156 of the valve R6 will both be positive but as there is an error, the second element of the signal unit will also be marking so that when the second selection pulse is applied to the grids of the valves HM and HS, the anode 127 of the valve HM will receive a positive voltage and the anode 128 of the valve HS a negative voltage. Therefore a positive voltage is applied from the cathode 134 to the left anodes 136 and 137 of the valves R5 and R6. However, as there is a positive voltage on the left grid 151 of the valve R5, the left anode 136 passes current and cathode volts will be set up on the cathode 138 and are passed through the diode D8 to increase the voltage on the left grid 143 of the valve R7 so that its anode 159 passes current to give the error indication on the relays EA and EB. Incidentally if the valve R7 is already in that condition, the change in the cathode voltage applied to its grid 143 would be an increase from about 25 to 50 volts but would not alter the condition of the valve R7.

Figure 8:
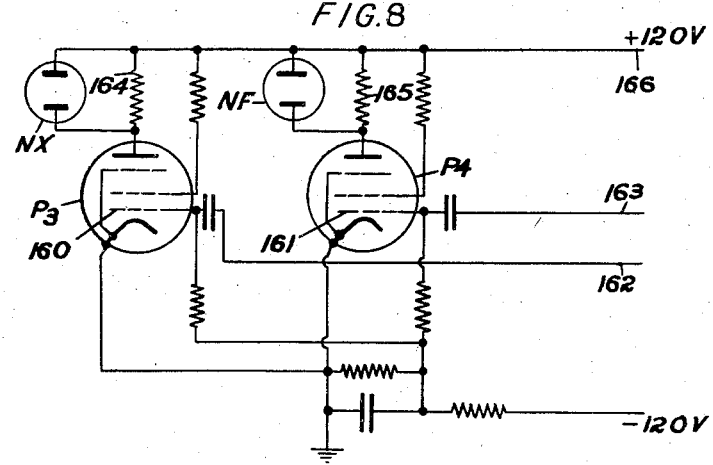
Figure 8 is a circuit diagram of the radio conditions indicator to be used in conjunction with Figure 7.

It has already been mentioned that arrangements are provided for distinguishing between mutilation due to fading and due to noise over the radio link. This is effected by the circuit shown in Fig. 8 connected to that shown in Fig. 7. In fact, two pentodes P3 and P4 are provided with their input grids 160, 161 connected respectively by conductors 162 and 163 to the cathodes 138, 139 of the valve R5 as seen in Fig. 7. A pair of two-electrode luminous tubes NX and NF are provided to indicate mutilation due to noise or like disturbances and fading respectively. These are connected across resistances 164 and 165 in the anode circuits of the valves P3 and P4 which are fed from the +120 v. source at 166.

For purposes of explanation, an error or mutilation may be considered as consisting of a signal unit in which both modulation elements are marking. In a correct signal, one of the elements should obviously have been spacing but has been changed to a marking modulation either by noise on the radio link or by multi-path effect. This mutilation gave rise to a pulse on the left-hand cathode resistance 140 in the circuit of the cathode 138 of the valve R5 and is transmitted through the conductor 162 to the input grid 160 of the valve P3. The latter passes current from the +120 v. source at 166 through the valve P3 and the voltage across the resistance 164 causes the luminous tube NX to glow and thus indicate an error due to noise or the like. This pulse is of less duration than that of the second pulse from the brush DR2 which is approximately 250 microseconds. Therefore, considerable energy has to be developed during that short pulse in order to provide a satisfactory indication.

If the mutilated signal unit consists of a spacing modulation element followed by a second spacing element such as could be caused by fading, the right anode 157 of the valve R5 becomes conducting at the second selection pulse and then, of course, a positive pulse is transmitted from the right-hand cathode resistance 140 through the conductor 163 to the input grid 161 of the valve P4 and then the discharge lamp NF glows to indicate fading or a misplaced element of modulation. Clearly the indicating lamps NX and NF will glow if the receiver runs out of synchronism and, as a result, the selection pulses become out of step with the received signals.

In summary, therefore, the receiving circuit shown in Fig. 7 results in the relay SR recording five-unit signals of one channel and the relays EA, EB operate to indicate a mutilation during the recording of each unit of a signal in the five-unit code by the relay SR whenever the comparison circuits and valves prove that mutilation has occurred.

The output from the relays SR, EA and EB control the output channel unit arranged so that an error pulse causes an "all blank" combination of units to be transmitted to the receiver teleprinter in the place of the mutilated signal received as will be explained later.

It will be noted that high resistances have been connected to the grids wherever grid current is likely to occur so that no grid currents can arise which would affect the operation of the circuits as described above.

Referring now to Fig. 10, the principle of the method of using the received signals to control the phase of the main driven components of the receiver is to obtain from the aggregate signals appearing on the anodes 82, 84 of the valves P1, P2 of the main receiving relay shown in Fig. 6, a series of short transit pulses which occur at the times of transit in the aggregate signals. This is effected by taking off from the conductors 86, 87 from the anodes 82, 84, connections 79 to a synchronizing gate valve GV through two switches 167, 168, two condensers 169, 170 and a double diode D9. This will be described in greater detail below but it may be mentioned that in Figure 11, in the top trace 171, the aggregate signals are shown exactly as in the trace 92 in Fig. 9 and again the letters A, B, C, D indicate the channels to which the signals belong and the symbols + and — indicate whether the respective signals are positive or negative. Thus, the trace 171 shows the variations in potential of the conductors 86, 87. The switches 167 and 168 are provided to enable the input to the gate valve GV to be taken from one or both sides of the main relay as desired. The action of the small coupling condensers 169, 170, is to cause the signals on the conductors 86, 87 to arrive at the left hand grid 172 of the gate valve GV in the form of very short pulses representing the transits of the incoming signals. These pulses are shown at 173, 174 in Figure 11 with one switch closed. The positive pulses 173 represent transits from spacing to marking and the pulses 174, transits from marking to spacing in the aggregate signals.

In describing Figure 5, reference was made to the synchronizing distributor SD which applies a positive pulse to the right anode 183 of the valve GV twice per revolution through the brushes SD1 and SD2 when the latter are bridged by one of the segments of the distributor SD. In the case of four channel working these synchronizing gate pulses are arranged by the spacing of the brushes SD1, SD2 to persist for four milliseconds and when the receiver is in phase, they start two milliseconds before a transit of the aggregate signals and end two milliseconds after such a transit. Since there are two segments on the distributor SD, these synchronizing pulses occur as shown at 176 in Fig. 11, during the transit of alternate signal units on the A channel or, in other words, in the example illustrated, every 64 milliseconds.

It has also been mentioned in connection with Fig. 5 that a synchronizing base light beam chopper disc SBC interrupts the light from a lamp L3 to a photoelectric cell PC3. The pulses from this cell, after amplification at 77, are applied to the grids of a double triode R8 and are applied to the system in the way to be described later. In Fig. 11, the periods of illuminating the cell PC3 are indicated by the positive lines 177 and the periods when the photo-cell is obscured or dark by the lines 178. The square wave pulses generated in this way are shown in Fig. 11 by the trace 179 and the light beam is interrupted by the disc SBC after eight baud intervals producing a complete double square wave over 64 milliseconds at one eighth of the speed of the aggregate signals, that is to say, in this example, at a frequency of 15.625 cycles per second. As will be explained later, the positive halves of the waves 179 are provided to discriminate an advance in phase of the incoming signals and the negative half waves to register a delay in phase of the incoming signals. The transit pulses 173, 174 as will be seen later, are only effective for the duration of the synchronizing gate pulses 176 and then provide the effective synchronizing pulses which are shown at 180 in Fig. 11. It will be observed from Fig. 11 that the gate pulses 176 only occur during the transit of the square wave 179 from positive to negative and not during the transit of that wave from negative to positive.

With the above preliminary explanation the operation of the unit shown in Fig. 10 can be clearly appreciated.

The gate valve GV is a double triode with the left anode 175 normally conductive and then the anode 175 is at negative potential which is applied to the right-hand grid 181. When, however, a negative transit pulse 174 is applied to the left grid 172, the anode 175 is rendered non-conductive and rises in potential to swing the right grid 181 to positive potential relatively to its cathode 182. If this occurs when a positive gate pulse is applied from the brush SD2 to the right anode 183 of the valve GV, the anode 183 becomes conductive and the cathode potential at the top end of the resistance 184 is obtained. The effective voltage of the transit pulses from the incoming signals, last for approximately 100 microseconds due to the condensers 169 and 170 and only one such pulse should arrive on the grid 172 during the time that the corresponding anode 175 is rendered positive by the gate pulse. Incidentally, when the receiving unit is in correct phase with the incoming signals this one transit pulse is impressed on the grid 172 to coincide with the change of the flip-flop valve R8 from the advance to the retard condition. This can be seen from Fig. 11 where it is seen that the pulse 180 coincides with the change of the trace 179 from positive which is the advance condition to negative which is the retard condition. If, however, the pulse 180 arrives early, then the receiving components need to be advanced and the pulse 180 then arrives during the positive part of the trace 179 before the change over. The result of this is that one only of two valves AV and RV, that is to say, the advance valve AV, will have on its anode 185 positive volts from the right-hand anode 186 of the flip-flop valve R8 through the conductor 187 but as the left anode 188 of the valve R8 is then at negative potential, this is conveyed to the anode 189 of the retard valve RV. Consequently an advance synchronizing pulse is developed in the cathode circuit of the valve AV because the synchronizing pulse 180 from the resistance 184 renders the valve AV conductive. It will be appreciated that if the transit pulse 180 should arrive late, the valve R8 will be in the retard condition shown by the negative part of the trace 179 and then the anode 188 will be positive and cause the pulse to be generated in the cathode circuit of the valve RV and that pulse will be a retard pulse.

The advance pulse set up on the cathode resistance 190 of the advance valve AV is of short duration and by means of a diode D10 and an integrating or counting valve CAV, such pulses are stored in one of a series of condensers 191. A diode D11 and counting valve CRV and condensers 192 serve the same purpose on the retard side.

After a predetermined number of positive advance pulses have been more or less consecutively applied to the grid 193 of the valve CAV, the condenser 191 to which the cathode 194 is connected rises to a potential which is connected through the conductor 195 and the left side of a double diode D12 and conductor 196 to the grid 197a of an advance gas discharge valve or thyratron T3 so as to cause that valve to fire. Incidentally the condensers 191 are of increasing capacities to enable the number of advance pulses which are to fire the gas discharge valve T3, to be varied. A diode D13 is provided on the advance side and, as will be seen later a corresponding diode D15 on the retard side, in order to limit the charge of the condensers 191, 192. One cathode of each diode D13, D15 is positively biassed from a resistance 190a and when, for example, the charge of condensers 191 applied to the right hand anode of the diode D13 exceeds the cathode bias voltage, the condenser 191 discharges to earth through the resistance 190a. The left hand half of diode D13 and the corresponding half of diode D15 are provided to by-pass transients. The valve T3 passes current from the +120 v. source at 197 through the winding of an advance relay SAR, through the valve T3 to earth at 198. The relay SAR therefore draws up its tongue 199 and, at its upper contact, causes current to pass from the +120 v. source through the armature of the direct current motor 77a (also seen in Fig. 5) downwards to earth at 198. The field winding of the motor 77a is separately excited from the +120 v. source at 200. The motor 77a therefore turns and rotates the stator 78 of the synchronous motor SM2 seen in Fig. 5 in the same direction as its rotor rotates and this causes all the components driven by the motor SM2 to be advanced relatively to the transit phase of the incoming signals. This rotation of the stator of the motor SM2 continues until the transit pulses fall on the gate valve GV during the retard condition of the flip-flop valve R8 as indicated by a negative part of the trace 179 in Fig. 11 and then, as already indicated, the retard pulses are applied to the retard valve RV and operate through the diode D11, counting valve CRV, condensers 192, diode D14 and gas discharge tube T4 in a manner similar to that already described for the advance pulses. Thus, the retard relay SRR is energized and its tongue 201, at its top contact, causes current to flow upwards in the armature of the motor 77A from earth at 198 to the −120 v. source at 202. It will be seen, however, that the retard pulses are also applied to the input grid 203 of an advance reset valve ARV from the cathode circuit of the valve RV by way of conductor 204 and condenser 205. The valve ARV is thus rendered conductive and a current flows from the positive source at 197 through a resistance 206, through the valve ARV to the negative source at 207. The resistance 206, however, it will be observed, is also in the anode circuit of the gas discharge tube T3 and as a result of the current flowing, there is a heavy voltage drop in the resistance 206 and thus the anode voltage of the gas discharge tube T3 is caused to fall below the voltage of its cathode 208 so that the tube T3 is extinguished and the motor 77A stopped. However, to avoid the first retard pulse from thus switching off the motor, a delay circuit is provided from the condensers 191, conductor 195, right side of diode D12 and a variable resistance 209 to the anode circuit of the tube T3. This circuit serves both the purpose of discharging the condensers 191 to a predetermined level after a phase correction has been made, as well as permitting adjustment of the number of retard pulses needed to extinguish the gas discharge tube T3. The retard side of the circuit is similar to the advance side with a retard reset valve RRV and a resistance 210 common to the anode circuits of that valve and of the gas discharge tube T4, the only difference being that while in the advance operation, the advance pulses add up and ultimately effect the advance of the phase of the receiving unit, the retard pulses arrest the advance correction and add up to retard the phase of the receiving unit and ultimately, this retard correction is arrested by the advance pulses.

It will be obvious from the description above of Fig. 7 and Fig. 9 that the signals forming the output from the relay SR are equally divided five-unit signals each aggregating 160 milliseconds in time. It is sometimes necessary to convert such signals into start-stop signals each comprising a start unit, five code units and a stop unit of twice the length of the other units but still aggregating 160 milliseconds. The apparatus is shown diagrammatically at MVA and SMA for the A channel in Fig. 5 and similarly for the other channels. The unit SMA is a synchronous motor arranged to rotate pairs of brushes over three commutators. In Fig. 12 there are three pairs of such brushes B3, B4 and B5. The motor SMA is supplied with current of 50 cycles per second from an inverter MVA-MVD similar to the inverter IV in the transmitter shown in Fig. 3 but having smaller components. In this case, however, the inverter is supplied with its locking frequency from the winding 73 of the alternator SRA through an amplifier 75. The commutators C3, C4 and C5 are arranged for one signal character to be transmitted during each half revolution and as the brushes B3, B4 and B5 rotate synchronously, they revolve at approximately 187.5 revolutions per minute as is the case for the distributor PD and the commutator SCI in the transmitter shown in Fig. 3. In Fig. 12, the commutator C3 has a continuous ring 211 which is the signal input ring and a ring of segments 212 which is the signal selecting ring. The commutator C4 has a ring of segments 213 which is the signal output ring and a ring of segments 214 which is the channel output relay ring while finally, the commutator C5 has a ring of segments 215 which is the error selecting ring and two half rings 216 forming the error input ring. In Fig. 12 arranged for normal recetpion, the signal relay SR is shown and also the error indicating relays EA and EB but the latter does not serve any purpose in this case. It will be observed that the signal relay SR when operated to its upper or lower contact, connects the +120 v. source at 217 or the −120 v. source at 218 to the tongue of the relay and thence to the signal input ring 211 of the commutator C3 so that as the brushes B3 rotate to the right in Fig. 12, they connect the tongue of the input relay SR to condensers K1–K5 in sequence through the ring 211 and the respective segments 212. The spacing of the segments 212 is equal to the time of one signal unit recorded on the relay SR so that by rotating the stator of the motor SMA through a suitable angle for which an adjustment is provided, it may be arranged for the brushes B3 to connect the condenser K1 to the tongue of the relay SR in the middle of the recording of the first unit of each five-unit signal combination. It then follows that the condensers K2–K5 are connected to the tongue of the relay SR at the middle of each of the corresponding code units. In other words with such an arrangement, the five-unit signals set up on relay SR are converted into five-unit charges, either positive or negative on the five condensers K1–K5.

It can also be seen from Fig. 12 that each of the condensers K1–K5 is connected to an associated segment of the signal output ring 213. There are ten segments 212 equally spaced and sixteen segments 213 equally spaced so that the angular separation of adjacent segments 213 is 62.5% of the separation of the segments 212. Since, however, all the brushes move at the same angular velocity, the spacing of adjacent segments 212 in the present case is 32 milliseconds and that of the segments 213 is 20 milliseconds in terms of the interval between the respective brushes passing from the centre of one segment to the next.

As is also indicated in Fig. 12, the relative angular positions of the brushes B3 and B4 are such that immediately the brushes B4 have traversed the first segment 213a associated with the condenser K1 and thereby taken off the signal previously stored in that condenser, the brushes B3 make contact with the segment 212a also associated with the condenser K1 to store another signal unit in that condenser. In other words, the brushes B4 will connect the condenser K1 through the segment 214a, conductor 219, lower contact 220 of the error relay RE, conductor 221 to the winding of the output relay RS and to earth so as to discharge the condenser K1 just before the brushes B3 charge it again to a voltage condition determined by the position of the tongue of the relay SR. Furthermore, the brushes B4 proceed to discharge the remaining condensers K2–K5 before they are recharged by the brushes B3. This arrangement provides sufficient electrical overlap to allow start and stop pulses to be inserted.

It will be noted that the first segment 213s and the ninth segment 213s of the ring 213 are connected by conductor 222 to the tongue of a relay CM associated with valves AS1 and AS2 of an auto-stop device to be described below. The tongue is normally in contact with the lower contact connected to the —120 v. source so that the brushes B4 collect from the segments 213s start pulses which are passed to the output relay RS and these are followed by the code units from the first segment 213a and the succeeding four segments or in the case of the second half of the distributor C4 from the first segment 213b and the succeeding four segments. Segments 213t are connected by conductor 221 permanently to the +120 v. source so that the brushes B4 collect stop pulses from segments 213t. Segments 213r are used to reset the error relay RE by applying positive voltage to the lower winding 223 of that relay. In summary, therefore, as the brushes B4 sweep over the segments 213s, 213a–213t and connect these segments to the ring 214, they send to the output relay RS a start pulse, the five units of the character from the condensers K1–K5 following which the stop pulse is sent from the segment 213t.

The above operation is that which occurs when there is no mutilation of the signal, but if mutilation occurs, then the relay EA will move its tongue to its upper contact 224 and charge the condenser K6 positively from the +120 v. source at 217.

The condenser K6 is connected by the brushes B5 through the segment 215a or 215b to the upper winding 225 of the error relay RE and consequently discharges to earth through that winding. As a result, the relay RE lifts its tongue thereby disconnecting segments 214a–214e and segments 214h–214n from the output relay RS at the lower contact 220 and connecting those segments to earth at the upper contact 226. The result is that as the brushes B4 move over their segments to pick up the charges in the condensers K1–K5, these condensers are merely discharged to earth at 227 while the output relay RS remains on its lower or negative contact 228 as determined by the first or start segment of the ring 214. Thus, whenever the error relay RE is operated into its marking condition, the combination of five negative units is transmitted. As the brushes B4 move from the stop segment 213t, they pass on to the error reset segment 213r and thereby pass current from the +120 v. source at 228 by the conductor 229 to the lower winding 223 of the error relay RE which thus draws its tongue down to the lower contact 220.

It will therefore be appreciated that when a mutilation or error is received, the signal combination will be stored in the condensers K1–K5, the error pulse of any of the signal units is stored in the condenser K6 and when the brushes B5 move on to segment 215a or 215b which is at the instant that the brushes B4 are about to send the start pulse, the error relay RE is operated so that the signal combination set up in the condensers K1–K5 is discharged to earth as the output relay RS transmits the five negative combination instead of the signal stored in the condensers.

The idle condition on the channel puts the relay SR permanently on its upper contact or positive side which means that at each operation, the condensers K1–K5 receive positive charges but since the brushes B4 insert the start signal, the tongue of the output relay RS will pass combinations consisting of five positive units from its upper contact to the teleprinter through the line 76 continuously.

However, provision is made by means of an idle signal eliminator to avoid this wear and tear on the receiving teleprinter during such idle periods. This provision includes automatic stop triodes AS1 and AS2 arranged as follows:

When the relay SR is in its positive position on its top contact as shown in Fig. 12, the +120 v. source at 217 is connected by the relay SR through the conductor 231 to the cathode 232 of the triode AS1 and similarly a negative condition of the relay SR at its lower contact applies the —120 v. source at 218 to the cathode 232 and during the first negative unit, the condenser K7 in the grid circuit of the triode AS2 is charged by the current flowing up from earth at 233. When, however, on the occurrence of a positive unit, a positive pulse is applied from 217 to the cathode 232 the condenser K7 commences to discharge through its shunting resistance 234, the value of which is so adjusted that when the relay SR has applied consecutively a predetermined number of positive units say for example 100 positive units, the negative charge on the condenser K7 relatively to that of the grid 235 and the cathode 236 of the valve AS2 falls below cut-off so that the valve AS2 becomes conductive and current flows from the +120 v. source at 237 through the winding of the relay CM already mentioned and the valve AS2 to earth at 233. Thus, the relay CM is energised, raising its tongue to connect the +120 v. source at 237 to the starting segments 213s of the commutator C4. In this way, the brushes B4 continuously transmit positive units until the first negative unit is set up on the relay SR.

In Fig. 13, the same commutators and relays are employed as shown in Fig. 12 but they are connected for repetition working which means that each signal combination is repeated and the repeated transmissions are compared in the receiver in such a way that when any signal unit is mutilated during only one of its two transmissions, it is correctly recorded or, in other words, a signal unit has to fail during both the transmissions to be finally registered as a mutilation in which case, the error-indicating symbol is provided by the teleprinter in the place of the signal character which should appear if there were no mutilation. Furthermore, the arrangement shown in Fig. 13 enables comparison to be made to detect complete reversal of a signal unit, that is to say, to show when marking and spacing elements are recorded for the same signal unit in successive transmissions and also when this occurs, the error-indicating symbol is printed in the place of the signal character which should be printed if there were no error. In this case, the tape transmitter shown particularly in Fig. 2, is modified in a way not shown so that by the operation of a switch, the feed mechanism is set so that the perforated tape is only stepped forward after each alternate release of the distributor brushes B1, B2 (Fig. 2) and, in this manner, each character is transmitted twice and then the paper tape stepped on to the next combination.

When working according to Fig. 13, the reception of signals as described with reference to Fig. 7 and the synchronizing arrangements described with reference to Fig. 10 are unchanged and the first difference between the operation with repeated signals according to Fig. 13 and that described with reference to Fig. 12 is that the second error-indicating relay EB is now utilized. Incidentally the components bear the same reference characters in Fig. 13 as in Fig. 12 insofar as that is possible. Thus in Fig. 13, whenever a mutilation occurs, both error-indicating relays EA and EB are operated and in fact, they always operate together. The operation of the relays EA and EB into their upper positions removes the positive source at 217 and the negative source at 218 from the contacts of the relay SR and the connections of the source of supply to the relays EA and EB have been accordingly somewhat modified in Fig. 13. Consequently any unit recorded as a mutilation is not in Fig. 13 stored in the associated condenser K1–K5. The upper contact 238 of the relay EB is connected to the left half of the error input ring 216 of the commutator C5 and the upper contact 224 of the relay EA is connected to the right half of the ring 216 but the two halves of this ring are no longer directly connected together. The ring of segments 215 contains twelve segments but two of these 215x are not now used. The remaining ten are engaged by the brushes B5 in the same phase as the corresponding contacts of the ring 212 of the commutator C3 are engaged by their brushes B3 and this occurs, as explained in connection with Fig. 12, in the middle of each signal unit to effect the selection of the unit and to store it in a condenser K1–K5. In other words, the first operative segment 215c in the ring 215 of the commutator C5 is traversed by the brushes B5 at the same time that the segment 212a of the commutator C3 is traversed by the brushes B3 and so on.

Thus, if there is a mutilation in the first signal unit, the error-indicating relays EA and EB are energised and their tongues move upwards, so cutting off the signal relay SR and rendering its recording of the signal inoperative and making the contacting of the brushes B3 with the segment 212a non-effective. Instead, however, a condenser K8 connected to the segment 215c of the commutator C5 is charged to record a mutilation in the first signal unit. Therefore as the brushes B3 and B5 sweep over their commutator segments, each signal unit, if correct, will be recorded as a positive or negative unit in the form of a charge in its condenser K1–K5 or if the unit is mutilated, it will be recorded as a charge in the corresponding mutilation storage condenser K8–K12.

If then the brushes B3 and B5 have swept over the last five segments of the rings 212 and 215 and this is regarded as the first transmission of a character which has been received, it is recorded in the manner described above, each unit having been stored in a condenser K1–K5 or K8–K12; then assuming that the first unit of a character was mutilated, then when the brushes B3 and B5 leave the last segments of the rings 212 and 215, the condition is that nothing is stored in condenser K1 but the correct units are stored in the condensers K2–K5 and the first unit is stored as a mutilation in condenser K8 but the condensers K9–K12 do not receive any charge. It should be borne in mind that the brushes B4 have wiped out the previous setting on the condensers K1–K5 ahead of the brushes B3 as described with reference to Fig. 12.

It is convenient to describe first the complete operation when a character combination is received as correct. In the above sense, the brushes B3, B4 and B5 sweep over the left-hand halves of their distributors during the reception of the second transmission of the combination and as it is assumed that no unit is mutilated, the units will be again stored in the condensers K1–K5 but this time, the condenser K1 will be correctly charged and condenser K8 will be discharged through the left-hand resistance 216a to earth. Thus, as the brushes B4 sweep over the segments of the right-hand half of the commutator C4, the charges stored in the condensers K1–K5 will be passed from the segments 214h–214n through the lower contact 220 of the relay RE to the winding of the output relay RS and to earth. It should be remembered that the brushes B3 and B5 follow immediately and are selecting the first transmission of the next character combination. While the brushes B4 are sweeping across the left-hand half of the commutator C4, no character is transmitted to the output relay RS because the segments 214a–214e of the commutator C4 are merely connected together and have no other connection and since, under repetition conditions, there is no start impulse because the segment 214s is disconnected in this half of the distributor, the output relay RS remains in the positive position while the brushes B4 sweep over the left-hand half of the commutator C4.

Now considering the state of affairs taken above when the first signal unit was stored in the condenser K8 as a mutilation in the form of a negative charge and in the repeated transmission the first unit is also mutilated; then since the condenser K8 is charged negatively to approximately 100 volts from the negative source at 218, through the contact 224, conductor 239 and segment 215d, the second selection will cause a complete reversal and whenever a mutilation occurs during the second transmission, the condenser K8 is charged to approximately 100 volts positive from the source at 217, through conductor 240 and segment 215c. Thus, in this case, a voltage swing of about 200 volts on the condenser K8 has been produced and clearly except when one of the condensers K8-K12 has its charge reversed in this way, its charge never rises above about 100 volts. The condensers K8-K12 are connected to a resistance 241 having an intermediate tapping 242 which is electrically connected by a conductor 243 through an isolating diode D14 to the grid 244 of an error valve EV1. There is a bias on the grid 244 such that the valve EV1 is only affected when the grid 244 receives a voltage due to a reversal of charge in one of the condensers K8-K12 and, in that case, the valve EV1 becomes conductive and passes current from the +120 v. source at 245 through the valve EV1 and conductor 246 to the upper winding of the error relay RE and to earth at 247. Thus, the error relay RE operates and disconnects the segments 214h-214n from the output relay RS and connects them through its upper contact 248 to earth at 249. Thus, the brushes B4 will send the start signal to the relay RS and because of the disconnection just mentioned, it will send no further pulse until the stop pulse and these five spaces form the signal combination which causes the error symbol to be printed. It will therefore be appreciated that with this repetition operation, an error symbol will not be transmitted instead of a character signal unless there is error or mutilation in both transmissions of the same signal unit. This, however, is not entirely correct for it is arranged that if a signal unit is completely reversed by disturbance over the radio link, that is to say, the transit from one condition of modulation to the other is reversed, a further comparison is made because in such a case of complete reversal, the signal selecting and comparator unit would not detect a mutilation and the reversal would result in the signal unit in question being received in the first transmission as a positive unit and in the repeated transmission as a negative unit or vice-versa.

In order to deal with this, the signal storage condensers K1-K5 are charged relatively to earth at about 100 volts positive for positive units and about 100 volts negative for negative units by the commutator C3 and it will be clear that when the second transmission of a signal unit is received as a complete reversal of its first transmission, then when the second selection passes to a storage condenser K1-K5, the charge is completely reversed from 100 volts positive to about 100 volts negative or vice-versa. In other words, a voltage swing of approximately 200 volts will occur either from negative to positive or conversely. Now it will be noticed that the first two condensers K1 and K2 are connected to a resistance 250 provided with an intermediate tapping 251 and the condensers K3-K5 are connected to another similar resistance 252 with an intermediate tapping 253. The condensers are divided into groups merely to prevent what are called "back-wash" circuits. The intermediate tapping 251 is connected by a conductor 254 to the error valve EV1 through an isolating diode D15 and also through an isolating diode D16 to the grid 255 of an inverter valve EV2 and from the anode of that valve through another diode D17 to the grid 244 of the error valve EV1. When the voltage swing on one of the condensers K1-K5 is 200 volts positive with respect to earth, then the circuit passes through the diode D15 to cause the valve EV1 to become conductive and to operate the error relay RE as previously described. When, however, the 200 volt swing is negative with respect to earth, an electrical pulse of sufficient magnitude passes through the diode D16 to the grid 255 of the valve EV2 which is thus rendered non-conducting and its anode 256 becomes positive and through the diode D17 gives a positive pulse to the grid 244 of the valve EV1 which renders that valve conductive and operates the error relay RE as already described. The circuit for the condensers K3-K5 is precisely similar and the intermediate tapping 253 is connected by a conductor 257 to the other anode of the diode D15 and the other cathode of the diode D16; otherwise the connections follow through as for the conductor 254.

Thus, it will be followed that means are provided for comparing signal characters transmitted twice in succession and for ensuring that an error symbol is only printed in the place of the intended character whenever a signal unit has been recorded either once as a positive unit and once as a negative unit, or twice as a mutilated signal.

I claim:

1. A telegraph system for operation on a two-position even-length code comprising in combination, a transmitter embodying means for converting the positive and negative signal units of said even-length code into units for transmission, hereinafter called transit signal units, each of which units consists of elements of different signal levels characterized by a transit from one of said signal levels to the other of said signal levels in one of two directions, and a receiver connected to said transmitter by a transmission path in which the signal units are subject to mutilation, said receiver embodying means for sampling each transit signal unit, means responsive upon operation of said sampling means for establishing in said receiver a positive or negative signal unit in said two-position even-length code, means for detecting mutilation consisting of the absence of said transit between any two elements of a transit signal unit, and means responsive to the operation of said mutilation-detecting-means for causing the production in said receiver of a distinguishing signal for indicating such mutilation.

2. A telegraph system as defined in claim 1 for operation on the two position-five-unit code comprising means to cause said transmitter to transmit each combination of signal units twice in succession, and means within said responsive means for causing the production of said distinguishing signal only when mutilation of the corresponding signal units occurs in both transmissions.

3. A telegraph system according to claim 2 in which the receiver is provided with means for storing separately the signal units which are mutilated and those which are free from mutilation, and means for comparing the signal combinations stored during the transmission unit by unit, and means responsive to operation of said comparing means for establishing the said distinguishing signal combination for indicating a mutilation only when the two stored signals due to the same signal unit during both transmissions are stored as mutilated units.

4. A telegraph system according to claim 3 including a series of condensers for storing mutilated signal units, means for storing in the same condenser of said series of condensers the corresponding signal units when mutilated during both the first and repeated transmissions, said last mentioned means serving to apply to the said same condenser charges of opposite sign, an error relay, means responsive to the voltage swing of said same condenser when subjected to charges of opposite sign to cause operation of said error relay, and means responsive to the operation of said error relay to cut off the signal units free from mutilation from the receiver output and to cause the production of an all-blank signal combination which is an all negative signal combination.

5. A telegraph system as defined in claim 1 in which the said even-length code is a five-unit code, and in which said means responsive to the operation of said mutilation-detecting means includes means for producing in said receiver a distinguishing signal consisting of five spacing signal units of said even-length five-unit code for indicating such mutilation.

6. A telegraph system as defined in claim 1 in which the transmitter includes circuit means for establishing signal combinations in accordance with perforations in a tape bearing a message in even-length five-unit code with an all marking combination constituting the letter shift combination and in which said means responsive to the operation of said mutilation-detecting-means includes means for producing in said receiver a distinguishing signal consisting of five spacing signal units in said even-length five-unit code for indicating such mutilation, said transmtter also including means for changing the idle signal combination established by an all-blank combination on the said perforated tape into an all marking, or letter shift, signal combination for the purpose of avoiding confusion with the said distinguishing signal that indicates mutilation.

7. A telegraph system as defined in claim 1 in which the transmitter includes circuit means for establishing signal combinations in accordance with the perforations in a tape bearing a message in even-length five-unit code with an all marking combination constituting the letter shift combination, and in which said means responsive to the operation of said mutilation-detecting-means includes means for producing in said receiver a distinguishing signal consisting of five spacing signal units in said even-length five-unit code for indicating such mutilation, said transmitter also including means for changing the idle signal combination established by an all-blank combination on said perforated tape into an all-marking, or letter shift, combination for the purpose of avoiding confusion with the said distinguishing signal that indicates mutilation, said transmitter comprising a pair of gas discharge tube elements connected together and to the contacts controlled by the perforated tape so that the establishment of an all-spacing combination causes one tube to be non-conductive and the other thereby to become conductive, a relay responsive when said other tube becomes conductive to change the polarity of battery connection to the said contacts controlled by the perforated tape so as to establish an all-marking, or letter shift, combination of signal units in said five-unit code.

8. A telegraph system in which messages are initiated and recorded in units of a two-position equal-length code, said system including a signal-unit-converting transmitter comprising means for converting the positive and negative signal units of said even length code into units for transmission hereinafter called transit signal units each consisting of two elements of different signal levels separated by a transit from one of said signal levels to the other level in one of two directions, a receiver connected to said transmitter by a transmission path in which the signal units are subject to mutilation, said receiver including a teleprinter and embodying means responsive to said transmitted transit signal units for establishing in the receiver positive and negative signal units corresponding respectively to the initiated positive and negative units of said two-position equal length code, means for deriving upon receipt of the transit signal units start and stop signals for combination with the said established positive and negative units to operate said teleprinter.

9. In a telegraph system in which the signal unit combinations forming a message are units of a two-position equal-length code, a signal-unit-converting transmitter comprising means for converting the positive units of the equal length code into signal units for transmission characterized by a transit from one signal level to another, and means for converting the negative units into signal units for transmission characterized by a transit from the second-mentioned signal level to the first.

10. In a telegraph system in which the signal unit combinations forming a message are set up as units of a two-position even-length code, a signal unit converting transmitter comprising means for converting the positive units of the equal length code into signal units for transmission having two elements of equal duration but different signal levels with an intervening transit from one level to the other in a given direction, and means for converting the negative signal units into signal units having two elements of equal duration but different signal levels with an intervening transit from level to level in the direction opposite to said given direction.

11. In a telegraph system in which the signal unit combinations forming a message are recorded on a tape perforated according to a two-position even-length code, a signal-unit-converting transmitter as defined in claim 9; said transmitter including a set of contractors for actuation by the perforated tape, a distributor, a relay having an input and an output, means for synchronously driving said distributor to apply the signal units of the equal length code to the input of said relay, and means for supplying positive and negative units from the output of said relay to the corresponding said converting means.

12. In a telegraph system in which the signal unit combinations forming a message are units of a two-position equal-length code, a signal-unit-converting transmitter comprising means for converting the positive and negative units of the equal-length code into units for transmission consisting respectively of a transit from one signal level to another and of a transit back from the second signal level to the first, a distributor and means for synchronously driving said distributor in timed relation to sample each signal unit in the equal length code at substantially the middle of said unit, means to pass said signal unit samples to said converting means, said converting means comprising means for storing signal units corresponding to those of the equal length code and means for combining said stored units in said storing means under control of said samples so that transit signal units are produced of a sense depending on the sign of said sample.

13. The combination according to claim 12 and in addition thereto a generator for producing selecting pulses said generator including a source of illumination, a photoelectric cell, a synchronously driven slotted light chopper disc rotatable between the source of illumination and the photoelectric cell to produce selecting pulses by illumination of said cell for brief time intervals in sequence, a selecting pulse distributor with means connected to pass on said selecting pulses to the said converting means at times predetermined with respect to the duration of the signal units in the equal length code.

14. A telegraph system comprising the combination according to claim 13 wherein the selecting pulses produced by said generator comprise a series of first selecting pulses each in the first half of the respective stored signal unit in the equal length code and a series of second selecting pulses each in the second half of the respective stored signal unit in the equal length code, and wherein the selecting pulse distributor comprises alternate paths, one arranged to pass said first selecting pulses into said converting means so that the converting means builds up the first signal level of each signal unit in the transit code, and the other path arranged to pass said second selecting pulses into said converting means so that the converting means builds up the second signal level of each signal unit in the transit code.

15. A telegraph system comprising the combination of claim 14 wherein said converting means comprises a first flip-flop-connected electronic tube circuit having its first control grid connected to receive said samples of the equal length code signals, a second flip-flip-connected electronic tube circuit having both its anodes connected to the second anode of the first tube circuit and a third flip-flop-connected electronic tube circuit having both its anodes connected to the first anode of the first tube circuit, and wherein there is a path for the first selecting pulses from the said selecting pulse distributor to the first control grids of the second and third tube circuits and also a path for the second selecting pulses from the selecting pulse distributor to the second control grids of the second and third tube circuits, the first cathode of the second tube circuit and the second cathode of the third tube circuit being connected to a common output circuit which carries pulses establishing one of the signal levels of the transit signals, and the second cathode of the second tube circuit and the first cathode of the third tube circuit being connected to a common output circuit which carries pulses establishing the other of the signal levels of the transit signals, both said common output circuits forming part of said converting means.

16. In a telegraph system comprising the combination according to claim 15 and including an electronic output relay for the transit signal units including a flip-flop-connected electronic tube circuit having its control grids connected respectively to the said two common output circuits so that the conditions of the two levels of the transit signals are constituted by the conductive condition of the responsive anodes of the last mentioned flip-flop-connected electronic tube circuit in the electronic output relay.

17. A multiplex telegraph system comprising a plurality of channels each including a signal-converting transmitter as defined in claim 12, a selecting pulse generator common to said channels connectable successively to each of said signal-converting transmitters so that selecting pulses are passed to the said converting means in the transmitters of the respective channels in timed sequence for causing successive operation of said plurality of converting means.

18. In a telegraph system in which a message is initiated in the unit combinations of a two-position equal length codes and is transformed into a transit signal code in which the positive signal units of the equal-length code have become transit signal units having two elements of different level with a transit in one direction from level to level and the negative signal units of the equal length code have become transit signal units having two elements of different level with a transit from level to level in another direction, a telegraph receiver comprising means for sampling each transit signal unit during one of the elements of the signal unit, and means responsive to the respective signal levels of said element samples for establishing positive and negative signal units of said two-position equal length code whereby said message is reproduced in said receiver in the initial code.

19. The combination according to claim 18 in which said telegraph receiver is connected to an incoming line carrying said transit signal units of changing levels and includes a pair of electronic gate tubes having anodes with means to apply positive potentials to said anodes respectively during one signal level of the incoming transit signal units and during the other signal level of the incoming transit signal units, and having control grids connected to receive a positive pulse during one of the elements of each transit code signal unit, and a flip-flop tube circuit having its control grids connected respectively to the cathode circuits of said gate valves so that the transit signal units are converted into signal units in a two-position equal-length code established on the anodes of said flip-flop tube circuits.

20. The combination according to claim 19 comprising a further pair of gate valves connected as cathode followers with their anodes connected respectively to the anodes of said flip-flop valve combination, means connected so that the control grids of said flip-flop valves receive a positive pulse at a predetermined time for each signal unit after the said establishment of said signal unit on the anodes of said flip-flop valve combination, a second flip-flop connected valve combination hereinafter called the output-flip-flop-connected-valve-combination having its control grids connected respectively to the cathode circuits of said further gate valves, and a double-wound electromagnetic output relay having its two windings connected respectively in the two anode circuits of said output-flip-flop-connected-valve combination so that the signal units in the equal length code are recorded at the contacts of said output relay after a time delay.

21. In a telegraph system in which signal transmission is effected on a transit code employing two kinds of signal units each consisting of two elements of different signal levels separated by a transit in one of two directions, a code-converting receiver comprising means for sampling each received transit signal unit during the first of its elements and for establishing a positive or negative signal unit in a two-position equal-length code in dependence upon the signal level of the first element and persisting during both elements of the unit of the said transit code, means for sampling each signal unit of the said transit code during the second of its elements and for establishing a positive or negative signal unit in dependence upon the signal level of the second element, means for comparing said first mentioned established positive or negative signal unit with said second mentioned established positive or negative signal unit, and an error indicator connected to said comparing means and operable to indicate an error when said first mentioned positive or negative signal unit and said second mentioned positive or negative signal unit are of the same sign.

22. In a telegraph system in which signal transmission is effected on a transit code employing two kinds of signal units each consisting of two elements of different signal levels separated by a transit in one of two directions, a code converting receiver comprising two pairs of electronic valve elements with connecting means such that the control grid of the first of the first pair of valve elements and the control grid of the second of the second pair of valve elements receive a positive charge when the first element of a received transit code signal unit is of one signal level, and the control grid of the second of the first pair of valve elements and the control grid of the first of the second pair of valve elements receives a positive charge when the said first element of the transit code signal unit is of the second signal level, means causing the anodes of the second valve elements of both pairs to receive a positive potential when the second element of the transit code signal unit is of the first named signal level and causing the anodes of the first valve elements of both pairs to receive a positive potential when the second element of the transit code signal unit is of the second named signal level, so that when a transit signal unit is correct after transmission in that it still consists of two elements of different signal levels, one of said first pair of valve elements is rendered conductive and when a transit signal is mutilated, consisting of two elements of the same signal level, one of said second pair of valve elements is rendered conductive, an error-indicating electromagnetic relay having two windings one of which is an operating winding connected to be energized to indicate a signal unit mutilation when said one of said second pair of valve elements becomes conductive, and the other of which is a restoring winding connected to be energized to remove said indication of mutilation when said one of said first pair of valve elements becomes conductive.

23. In a telegraph system in which signal transmission is effected on a transit code employing two kinds of signal units each consisting of two elements of different signal levels separated by a transit in one of two directions, a telegraph receiver comprising signal-unit-converting means for establishing signal units in the two-position equal-length code in response to the receipt of transit signal units, an electromagnetic signal relay connected to said converting means, a commutator, means for synchronously driving said commutation to receive and select each combination of the code signal units from the signal relay twice in succession and to store said code signal units, a second commutator and means for driving said second commutator in step with said first commutator, said second commutator having segments spaced to distribute the stored code signal units before the next combination of units is stored, a third commutator and means for driving it in step with said first commutator, said third commutator having segments in the same phase as the code unit segments of the first commutator, said third commutator having a pair of continuous rings each coextensive with the segments corresponding to one combination of code signal units, an error indicating relay comprising a pair of relays having their actuating and their restoring windings connected to operate respectively simultaneously and their contacts connected so that when the relays are actuated, the poles of the electrical supply are disconnected from the contacts of said signal relay and are connected to the respective continuous rings of said third commutator, means responsive to the connection of the poles to the said continuous rings to store the mutilated code signal units as an error signal unit so that if the same code signal unit of a combination is mutilated during both selections, the error signal unit stored by the third commutator is reversed, and means actuated upon said reversal to cause an error-recording combination to be established.

24. In a telegraph system the combination according to claim 23 including condensers in which code signal units of correct form passed by the said signal relay to the said first commutator are stored for distribution by said second commutator, and a set of error condensers in which mutilated code signal units are stored by said third commutator, so that if the same code signal unit for a combination is mutilated during both selections, the charge on the corresponding error condenser reverses, an output relay, means responsive to the said reversal of charge to disconnect the code segments of the second commutator from said output relay and means for applying to said output relay a combination of all-negative signal units which is the error-recording combination.

25. In a telegraph system the combination according to claim 24 and a thermionic valve hereinafter called an error-thermionic-valve and means responsive to the said reversal in charge of one of the error condensers for applying a pulse to the control grid of said error-thermionic-valve, said error-thermionic-valve being so biased that it is rendered conductive only upon the occurrence of such a reversal in charge, an electromagnetic relay hereinafter called an error-electromagnetic-relay and means for passing the resulting anode current when said error-thermionic-valve is conductive to said error-electromagnetic-relay, and means responsive to the operation of said error-electromagnetic-relay for disconnecting the code segments of the second commutator from said output relay.

26. In a telegraph system the combination according to claim 23 including condensers in which code signal units of correct form passed by said signal relay to said first commutator are stored for distribution by said second commutator, means for establishing an error-recording combination consisting of all negative signal units when a code signal unit is completely reversed from the first selection to the second selection despite the fact that owing to the signal unit being of correct form the error is not detected by the error-indicating relays, an output relay, means utilizing the reversal in charge of a signal condenser in either direction to cause the output relay to be disconnected from the code segments of the second commutator and to receive said error-recording combination consisting of all negative signal units.

27. In a telegraph system the combination according to claim 26 and a thermionic valve hereinafter called an error-thermionic-valve and means responsive to said reversal in charge of one of the error condensers for applying a pulse to the control grid of said error-thermionic-valve, said error-thermionic-valve being so biased that it is rendered conductive only upon the occurrence of such a reversal in charge, an electromagnetic relay hereinafter called an error-electromagnetic-relay and means for passing the resulting anode current when said error-thermionic-valve is conductive to said error-electromagnetic-relay, and means responsive to the operation of said error-electromagnetic-relay for disconnecting the code segments of the second commutator from said output relay.

28. In a telegraph system the combination according to claim 27 including a potential dividing resistance, two rectifiers, an inverter valve, an error valve, means for applying said reversal in charge of a signal condenser to said potential dividing resistance so as to derive therefrom a potential which, if positive, passes through one of said rectifiers to the control grid of said error valve, and if negative is blocked by said one rectifier but is applied through said other rectifier to said inverter valve, and means responsive to application of said negative potential to said inverter valve to apply a positive potential to the control grid of said error valve.

29. In a telegraph system for operation on a transit code employing two kinds of signal units each consisting of two elements of different signal levels separated by a transit in one of two directions, a code-converting telegraph receiver for said signal units comprising a pair of electronic gate valves having their anodes connected to receive the signals and respectively to receive a positive potential for one or the other of the signal levels of the elements of a transit code signal unit, means for applying a positive pulse to the control grids of both gate valves during the first element of each transit code signal unit, a flip-flop-connected valve combination having its control grids connected respectively to the cathode circuits of said gate valves so that on reception of the first element of a signal unit of a predetermined signal level one side of the flip-flop combination is conductive and remains conductive until a signal unit is received having its first element of the other signal level, a second pair of electronic gate valves also having their anodes connected to receive the signals and respectively to receive a positive potential for one or the other of the signal levels of the elements of a transit code signal unit, means for applying a positive pulse to the control grids of both of said second pair of gate valves during the second element of each transit code signal unit, a pair of electronic valve elements hereinafter called error-electronic-valve-elements having their control grids connected respectively to the anodes of the flip-flop connected valve combination and their first and second anodes connected respectively to the cathode circuits of the second pair of gate valves, a pair of electronic valve elements hereinafter called no-error-electronic-valve elements having their control grids cross-connected to the control grids of the error-electronic-valve-elements and their first and second anodes connected respectively to the first and second anodes of the error-electronic-valve-elements, an error-indicating-relay and means for actuating said error-indicating-relay to the error-indicating position upon current flow in one of the error-electronic-valve-elements and for restoring the relay to the non-error-indicating position upon current flow in one of the non-error-electronic-valve-elements.

30. In a two-code telegraph system the combination according to claim 29 comprising also a double-wound electromagnetic relay, and a flip-flop connected electronic valve combination hereinafter called the error-flip-flop-connected-electronic-valve-combination, said valve combination having its control grids connected respectively to the cathode circuits of said error-valve-elements and to the cathode circuits of said no-error-valve-elements and its anodes connected respectively to actuating and restoring windings of an error-indicating relay which is said double-wound electromagnetic relay.

31. In a two-code telegraph system, the combination according to claim 30 comprising also a pair of diodes, a pair of resistance units, an indicator for indicating error due to noise, an indicator for indicating error due to fading, means for separately connecting the cathodes of said error-valve-elements through said diodes to one control grid of said error-flip-flop-valve-combination, said resistances being connected separately in said cathode circuits, and separate conductors connecting the cathodes respectively to said indicators.

32. In a two-code telegraph system the combination according to claim 31 in which the last mentioned indicators comprise a pair of electronic valves with their control grids connected to receive the respective voltages of the cathodes of the said error-valve-elements, separate resistances in the anode circuits of said error-valve-elements, a noise-indicating luminous tube connected across one of said anode resistances and a fading-indicating luminous tube connected across the other of said anode resistances.

33. In a telegraph system in which signal units initiated in a two-position equal length code are transmitted in a transit code having signal units each consisting of two elements of different signal level separated by a transit in one of two directions, a telegraphic code-converting receiver comprising means for sampling each signal unit during one of the said elements of the signal unit, means responsive to the signal level of the said element for establishing a positive or negative signal unit in a two-position equal length code, a distributor, means for synchronously driving said distributor to control the time of actuation of said sampling means, a voltage wave generator having a member to be driven in step with said distributor and means for adjusting the phase relation of said distributor relatively to the received transit code signals in dependence upon the times of transit of the received signals with respect to the voltage wave of said generator.

34. The combination according to claim 33 wherein the voltage wave generator comprises a photoelectric cell, a source of illumination, a light interrupter disc and means for synchronously driving said light interrupter disc so as to illuminate and obscure the photoelectric cell in such a way that the latter generates a voltage wave of substantially square form.

35. The combination according to claim 34 in which said synchronous driving means comprises a synchronous electric motor having a stator with an adjustable mounting, a reversible direct current motor coupled to said stator, and means including said direct current motor for adjusting said stator mounting to produce phase correction of said driving means.

36. The combination according to claim 33 comprising also a voltage wave generator and a flip-flop connected thermionic valve combination, said voltage wave generator including a photoelectric cell, a source of illumination, a light interrupter disc and means for synchronously driving said light interrupter disc to control the light on said photoelectric cell for producing a voltage wave of substantially square form, and means for connecting the photoelectric cell to the control grids of said flip-flop connected thermionic valve combination so that the positive and negative halves of the square waves become available at the anodes of the said valve combination.

37. The combination according to claim 33 in which said voltage generator produces a square wave, and comprising also a flip-flop connected valve combination, means for applying to the first control grids of said valve combination pulses occurring at the transits of the received transit code signals, means for applying to the second anode of said valve combination synchronizing gate pulses produced by a synchronously driven distributor and of a sufficient duration to admit one and only one of the signal pulses, a phase-advance electronic valve, a phase-retard electronic valve, means for applying to the control grids of said phase-advance and phase-retard electronic valves potential pulses derived from the second cathode circuit of the valve combination occurring at the times of transit of the received signals, and means for applying the square form voltage wave from said generator to the anodes of said phase-advance and phase-retard valves so that the former becomes conductive to advance the phase relation of the aforesaid synchronously driven members and the latter to retard the phase relation.

38. The combination according to claim 37 including condensers and counting electronic valves with means to connect each of said phase-advance and said phase-retard valves through one of said counting electronic valves to change one of said condensers so that the pulse flowing when either the phase-advance or phase-retard valve is rendered conductive is stored in the respective condenser.

39. The combination according to claim 38 including a pair of gas discharge tubes, a reversible direct current motor for effecting phase control of the said synchronous driving means and means for connecting said condensers respectively to said gas discharge tubes so that when either of the condensers is changed to a predetermined level, the corresponding gas discharge tube is caused to fire, means for applying the current flowing through said fired gas discharge tube to said direct current motor to rotate it in the proper direction to bring the synchronously driven members of the receiver into phase with the received signals.

40. The combination according to claim 39 including electromagnetic relays and means connecting the windings of said relays in the anode circuits of the respective gas discharge tubes so that when one said relay is energized current will flow in the armature of said phase-correcting direct current motor to cause the latter to rotate in the requisite direction to correct said phase.

41. The combination according to claim 40 including thermionic valves hereinafter called respectively the advance-reset valve and the retard-reset valve, means connecting the control grids of said advance-reset and retard-reset valves respectively to the cathode circuits of the said phase-retard valve and phase-advance valve so as to render said advance-reset and retard-reset valves conductive respectively on the occurrence of a retard pulse or an advance pulse, and common resistances included respectively in the anode circuits of said advance gas-discharge tube and said advance-reset valve and in the anode circuits of said retard gas-discharge tube and said retard-reset valve in such a way that when the advance-reset valve becomes conducting the resultant reduction in potential in the anode circuit of the advance gas-discharge tube causes extinction of the latter, and, similarly, when the retard-reset valve becomes conducting the retard gas-discharge tube is extinguished.

42. In a telegraph system for operation on a two-position even-length code in which positive and negative signal units of said even-length code are transmitted as transit signal units each consisting of two elements of different signal level separated by a transit from one of said signal levels to the other level in one of two directions, a code-converting receiver responsive to said transit signal units comprising a signal relay and means for establishing at the contacts of said relay equally divided signal units in a two-position equal length code, a commutator, means for synchronously driving said commutator to receive said code signal units from said signal relay and to store the same in succession, a second commutator, means to drive said second commutator in step with said first commutator, said second commutator having segments spaced to distribute the stored code signal units before the next combination of units is stored, and means including segments of said second commutator to introduce a start signal unit before and a stop signal after the distribution.

43. The combination according to claim 42 including an output relay and in which the second commutator has segments connected to pass the start, stop and code signal units through the winding of said output relay, an error relay having a back contact, means for normally passing the code signal units from said second commutator to said relay through the back contact of said error relay, means for energizing said error relay when mutilation of said code signal units occurs and means responsive to operation of said error relay to cut off the code signal units from said output relay.

44. The combination according to claim 43 including a third commutator and means for driving it in step with said other two commutators, another relay hereinafter called an error-indicating-relay, means for actuating said error-indicating-relay in response to the occurrence of an error or mutilation of the code signal units, means for storing an error signal via said third commutator upon actuation of said error indicating relay, and for passing said stored signal through the winding of said error relay, whereby said error relay is energized to cut off the code signal units from said output relay and to leave said output relay actuated by said start signal unit so as to pass on an all-negative combination.

45. The combination according to claim 44 in which said error relay has also a resetting winding, and means for connecting the said resetting winding to said second commutator so that on the occurrence of an error or a mutilation, after the stop signal is distributed, a pulse is sent to said resetting winding so that said error relay is restored.

46. The combination according to claim 42 including an output relay and a teleprinter connected to be actuated by said output relay, and in which the second commutator has segments connected to pass the start, stop and code signal units through the winding of said output relay, an error relay, a relay hereinafter called an auto-stop-relay, a condenser connected to receive positive signal pulses, an electronic valve connected to be energized from said condenser and in turn to energize the winding of said auto-stop-relay, means including said auto-stop-relay to prevent starting and stopping of said teleprinter during the idle condition of the system, said means providing for the elimination of the start signal units after the reception of a pre-determined number of positive signal units from the signal relay by leading the start signal units to the second commutator through a back contact of said auto-stop-relay.

RONALD GEORGE GRIFFITH.

REFERENCES CITED

The following references are of record in the file of this patent:

UNITED STATES PATENTS

| Number | Name | Date |
|---|---|---|
| Re. 20,330 | Morton | Apr. 13, 1937 |
| 1,880,906 | Duerr et al. | Oct. 4, 1932 |
| 2,095,144 | Masson | Oct. 5, 1937 |
| 2,209,883 | Gohorel | July 30, 1940 |
| 2,399,734 | Hailes et al. | May 7, 1946 |
| 2,404,339 | Zenner | July 16, 1946 |
| 2,457,974 | Bliss | Jan. 4, 1949 |
| 2,498,695 | McWhirter et al. | Feb. 28, 1950 |